United States Patent [19]

Kammeyer et al.

[11] Patent Number: 4,646,173
[45] Date of Patent: Feb. 24, 1987

[54] CONVERTING AND DECODING RECEIVER FOR DIGITAL DATA RECORDED IN ANALOG FORM ON MAGNETIC TAPE

[75] Inventors: Karl-Dirk Kammeyer, Paderborn; Andreas Rüngeler, Borchen, both of Fed. Rep. of Germany

[73] Assignee: Robert Bosch GmbH, Stuttgart, Fed. Rep. of Germany

[21] Appl. No.: 744,106

[22] Filed: Jun. 12, 1985

[30] Foreign Application Priority Data

Jun. 20, 1984 [DE] Fed. Rep. of Germany ....... 3422828

[51] Int. Cl.$^4$ .......................... G11B 5/09; G11B 5/00; H04B 1/10
[52] U.S. Cl. ...................................... 360/51; 360/32; 375/103
[58] Field of Search ................. 375/106, 103, 110, 86; 360/51, 32

[56] References Cited

U.S. PATENT DOCUMENTS 4,475,220 10/1984 Mattei et al. .......................... 375/86

OTHER PUBLICATIONS

"Microprocessor Implementation of High Speed Data Modems", Van Gerwin et al, IEEE Transaction on Communications, #2, Feb. '77.

*Primary Examiner*—Vincent P. Canney
*Attorney, Agent, or Firm*—Frishauf, Holtz, Goodman & Woodward

[57] ABSTRACT

Multi-phase/multi-level modulation data signals recorded on tape after conversion from original digital data are first converted to complex digital signals in an analog-to-digital converter in which the sampling rate is set by a pulse generator frequency controlled by the received signals through a control loop which develops a frequency control voltage (A). The complex digital signals have their real and imaginary parts separately filtered by filters of variable propagation time, but of constant bandwidth to produce complex signals to which the nearest permissible output complex signal (reference signal) is selected by a decision circuit (17), for final conversion to binary signals by a decoder (19) and a shift register (20). Timing shift correction is based on comparison of the received signals and reference signals of the decision stage to produce a control signal ($\phi$) which further processed by addition to its previous value to produce a timing correction signal (A) which is applied both to the pulse generator for the sampling frequency of the analog-to-digital converter and to control the propagation time of digital non-recursive filters (14, 15). The timing correction signal (A) control of the filter propagation time makes possible a rapid timing shift correction that overcomes tape jitter effects. It is not necessary to stabilize the received carrier frequency because the tap recording preserves the relation between the sampling/keying frequency and the carrier frequency.

7 Claims, 60 Drawing Figures

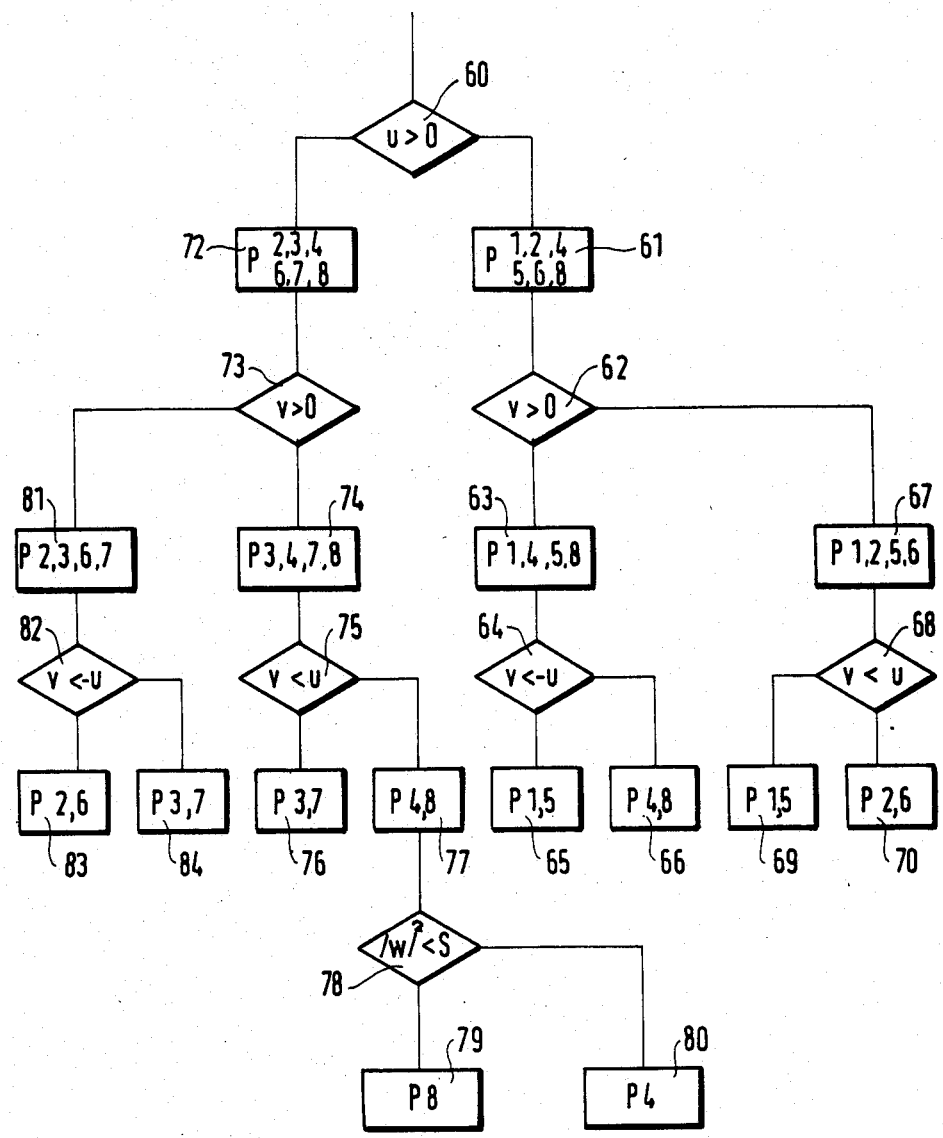

CONVERTING AND DECODING RECEIVER FOR DIGITAL DATA RECORDED IN ANALOG FORM ON MAGNETIC TAPE

This invention concerns an electronic receiving apparatus for data reproduced from a magnetic tape on which it was recorded in multistage modulation analog form for increase of the transmission rate after originally being converted from digital to analog form. By analogy to transmission circuits the corresponding recording apparatus is referred to as a transmitter and the data reproduction apparatus to which the present invention is referred to as a receiver.

The reason for the terminology just mentioned arises from the fact that multistage modulation has long been known in data transmission, as described by K.-D. Kammeyer and H. Schenk in vol. 33 of the periodical "Frequenz" (1979), pp. 141 ff. and 165 ff. under the title "A Flexible Experimental System for Data Transmission in the Telephone Field". At that time the interest in multistage modulation was aimed at further increasing the data transmission rate through telephone channels. Phase shift keying (PSK) and amplitude shift keying (ASK) are utilized as multistep modulation methods. It is essential, moreover, in this type of transmission that the data keying rate be recovered from the data transmission itself, since this is necessary for synchronous data transmission. Carrier wave and keying transition timing control and methods and apparatus for such transmission have also been known in connection with the development above described and are described, for example, in an article by D. Schollmeier and M. Schatz, Verfahren zur Trager- und Taktregelung bei Synchroner Datenubertragung, vol. 6, Siemens Forschungs- und Entwicklungsberichte (1977), No. 5, pp. 271–276. The keying rate control there described, however, is worked out there particularly for the problems of data transmission over telephone lines and is by and large unusable for data recording with tape and cassette recorders. Because of the unsuitability of the control schemes developed for transmission over telephone lines to the otherwise similar problem of making use of recording of data on audio frequency tape equipment, it has heretofore not been practical to utilize multistep modulation forms for recording of data on audio frequency magnetic tape apparatus.

For recording digital data on audio frequency magnetic tape apparatus, accordingly, two-step methods are usually employed, for example, ordinary frequency shift keying between a "mark" and a "space" frequency. This is sometimes referred to as two-level modulation, by analogy to amplitude keying where the levels are commonly 0 and 1. Multistep modulation in frequency, phase or amplitude uses multi-level codes rather than binary codes. The transmission rates (i.e. recording and reproducing data rates in the case of magnetic tape recording) available with the above-defined common two-step (two-level) modulation methods are comparatively low.

SUMMARY OF THE INVENTION

It is an object of the present invention to provide a data receiver for data recorded on tape in multi-step modulation of a carrier frequency in which the problems of deriving the keying rates accurately from the received signals with all necessary corrections for variation between recording speed and playback speed of the tape and for tape jitter are solved, so that the high recording and reproduction speed capabilities of multi-step modulation recording may be obtained with reliability of data transmission comparable to that of digital transmission. In this connection account is taken of the fact that the modulation keying rates are synchronized in recording to the digital word or byte rate which in telegraphy is known as the character rate. The present invention takes advantage of the fact that magnetic tape recording preserves the time relation (synchronism) of the keying/sampling rates at the carrier frequency.

The receiving filters are interposed between the analog-to-digital converter and the character frequency switch, which feeds in successive filtered signals to following stages. The filters have their propagation time controlled in a manner dependent upon the control signal used for keeping local clock pulses in step with the keying/sampling frequency of the received signal. The invention has the advantage that, as the result of the filter propagation time control, very fast fluctuations in timing can be regulated out. It is possible then to correct not only long period timing shifts but also, in a supplementary manner, the tape jitter disturbance which is picked up from magnetic tape recordings. The requirements for the use of multi-phase or multi-step modulation forms for recording digital data on audio frequency tape machines are thereby satisfied so as to make such recording practical. This makes possible a substantial increase of the recording and playback rates. There is a further advantage that the necessary control system and the receiver as a whole are relatively simple to manufacture and test and involve only slightly more expense than the known data receivers.

It is particularly advantageous in the practice of the invention to use multiplicative comparison of actual signals with reference signals, since that makes use of the fact that magnetic tape transmission to a receiver preserves the synchronism between the character rate and the carrier frequency even where the transmission has been disturbed by frequency discontinuities in certain carrier frequency intervals. For this reason the carrier frequency control, which would otherwise be necessary as a supplement to the derivation of the clock or sampling rate from the received signals, can be entirely dispensed with. It is also advantageous for the filters to be constituted as digital bandpass filters which can have their propagation time modification performed by calling out sets of filter coefficients from a permanent memory. In consequence the chief addition of somewhat expensive components for the system of the invention, in comparison with the known data modems, results from an increase in memory capacity required for the supplementary filter coefficients. Cost of modification of the receiver is practically limited, so far as the filter construction is concerned, to the use of a larger memory.

It is likewise advantageous that simple compensation is possible for amplitude disturbances produced by dust particles on the tape or worn places of the tape coding. It is particularly desirable in this regard to carry out the amplitude control by adjustment of the amplitude threshold in the decision circuit. This provides a particularly simple and reliable amplitude control. The evaluation of the received signals in the decision circuit is particularly effective when the sum signal of the absolute value squares of the received and referenced signals is utilized for control of the amplitude threshold. In that way the circuit expense is particularly low. For reducing disturbances under amplitude threshold control it is advantageous to provide a fixed weighting factor based on the past values of amplitude.

BRIEF DESCRIPTION OF THE DRAWINGS

The invention is further described by way of illustrative example with reference to the annexed drawings, in which:

FIG. 8 is a flow chart diagram of the operation of the decision stage, and

FIGS. 9-51 are replicas of figures of the article of which text is translated in the appendix of this specification with English legends substituted for German legends.

DESCRIPTION OF THE ILLUSTRATED EMBODIMENTS

Two-level-code step-modulated signals are commonly used for recording digital data on audio frequency magnetic tape devices. For a given band-width of the transmission channel the recording rate can be raised only by the use of multiple step methods. It is postulated for this purpose that there is sufficient linearity of the channel and a sufficient signal-to-noise ratio. Such multistep transmission methods find application, for example, in data transmission over telephone lines. Multiphase, multi-amplitude-level or combined kinds of modulation are mainly put to use in this case. In such telephone-line data transmission methods binary data are first related to complex numbers c by means of a coder, a step which determines the form of the modulation. A signal suitable for recording is thereafter obtained by digital-to-analog conversion, modulation and filtering. In the receiver the information can be recovered after analog-to-digital conversion, filtering by quadrature filter pairs, de-modulation, distortion compensation, selection of the nearest of a set of reference values (decision) and decoding.

The specific properties of the magnetic tape channel in magnetic tape transmission permit a simplification of system structure compared with conventional modem configurations. In this connection, account is taken of the fact that frequency discontinuities and resulting disturbed synchronism between character rate and carrier frequency do not occur at the receiver in the case of magnetic tape transmission. For that reason carrier frequency control, which usually must accompany derivation of the clock pulse rate, can be dispensed with. What is more significant, however, is the question of a suitable character rate synchronization in the reception of data stored on magnetic tape. The clock pulse information must be obtained in the receiver from the received signal in reading a magnetic recording, whereas during data transmission over telephone lines character rate derivations arise merely from differences between quartz-controlled frequencies used respectively for transmission and reception, leading to slowly rising or falling "ramps". These slow changes can be compensated for by known regulation or control arrangements quite easily. The tape jitter arising in magnetic tape recording produces supplemental clock offsets, the random nature which can accordingly not be compensated for by the known method. The evaluation of received data is also made difficult in tape apparatus because of signal dropouts occurring on account of the irregularities in tape material or of the contamination of sound heads with dirt or dust.

Figure 1:
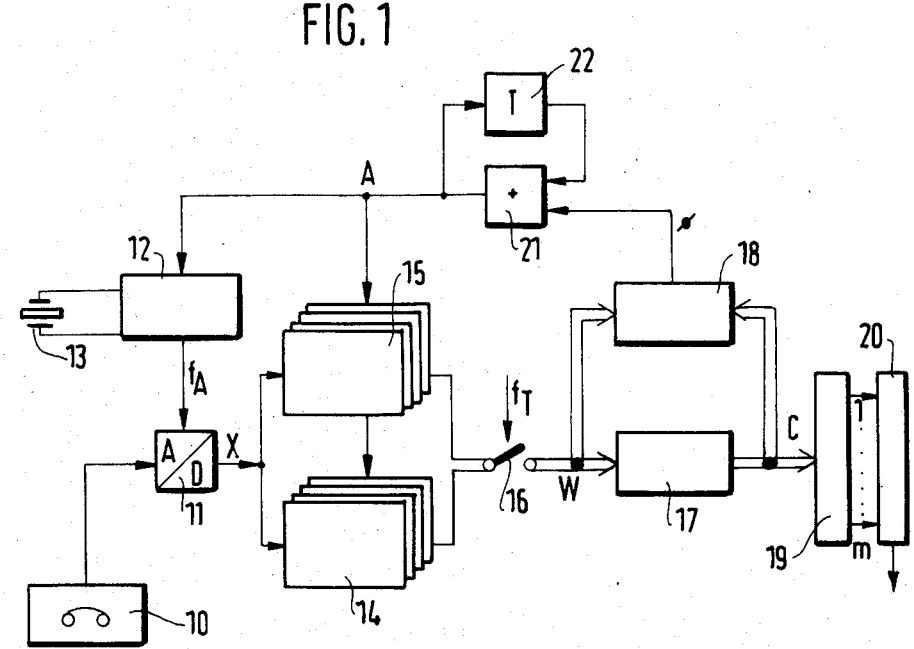
FIG. 1 is a circuit block diagram of the receiver of a data modem according to the invention.

FIG. 1 shows the block circuit diagram of a data receiver according to the invention. At the signal output of an audio frequency tape recorder 10 an analog-to-digital converter 11 is connected which furnishes its output signal x to a quadrature pair of filters 14 and 15. Each of the filters 14 and 15 consists of a multiplicity of filters which are constituted as bandpass filters and differ from each other in their propagation time. The output signals of the filter 14 and of the filter 15 are supplied to a switch 16. At the output of the switch 16 is the signal w which can be represented as a complex number i.e., a number having a real part u supplied by the filter 14 and an imaginary part v supplied by the filter 15. This complex data signal w is furnished both to a decision circuit 17 and to a clock pulse recognition circuit 18. At the output of the decision circuit 17 a complex data signal c appears which has a real part a and an imaginary part b. The complex signlal c is supplied to another input of the clock pulse recognition circuit 18. The data signal c is also supplied to a decoder 19 which produces a multiplicity of output signals 1 to m, which are supplied to a shift register 20, at the output of which binary data are obtainable.

The clock pulse recognition circuit 18 has an output providing the control signal $\phi$, which is supplied to an addition circuit 21, to the other input of which the output of a storage circuit 22 is connected. The output of the addition circuit 21 is furnished on the one hand to the input of the storage circuit 22 and on the other hand to a control input of the clock pulse generator 12 as well as to inputs of the filters 14 and 15. The clock pulse generator 12 is constituted as an oscillator controlled in frequency by a quartz crystal 13 which is nevertheless tunable over a certain range by "pulling" the control frequency, as for example, by varying a voltage-controlled capacitance connected so as to affect the resonant frequency of the crystal. Such circuits are well known and need not be further described here. The resonant frequency of the quartz crystal 13 is varied in a manner dependent upon the control voltage A which is provided as an output of the addition circuit 21. The analog-to-digital converter 11 is clocked at regular intervals by the clock pulse generator 12 at a sampling frequency $f_S$. On the basis of the synchronism between the sampling frequency $f_S$ and the character frequency $f_T$, it is possible to obtain, by a suitable frequency division operation (for which the circuits are not shown in FIG. 1) to derive the switch pulses at the frequency $f_T$ for the switch 16 from pulses generated by the clock pulse generator 12.

All of the circuits shown in FIG. 1, as well as the unshown frequency divider just mentioned, are constituted as a single computation component in technology that is now conventional. Further explanation and information regarding construction of such a computing component can be found in articles describing the design and construction of conventional data modems, for example P. J. van Gerwen et al, Microprocessor Implementation of High Speed Data Modems, IEEE Transactions On Communications, Vol. Com.-25, No. 2, February 1977, pages 238-250. In the following description, only modifications and variations of such design and construction which are evolved for practicing the present invention will be described in detail.

Data stored on the tape recorder 10 in an analog form in the two-stage combination of multiphase modulation and multi-amplitude modulation are converted at the clocked sampling rate into digital data by means of the analog-to-digital converter 11. The sampling rate for this step is to be chosen equal to the digital sampling rate used for converting digital data into analog signals in the transmitting operation when the data as converted was recorded on the tape with the recorder 10 operating at the same speed at which it is played for reproduction.

The filters 14 and 15 are constituted as digital bandpass filters and serve for filtering out the data information. The signal obtainable at the output of the filters 14 and 15 is now represented as a sequence of amplitude-sampled Nyquist pulses in the bandpass region having the property that, with respect to the maximum signal among the signals to be evaluated, all the preceding and following signals each have a null transition. Because of the fixed relation between the sampling frequency for the analog-to-digital converter 11 and the synchronizing frequency fT, the sampling takes place at the correct instant of the cycles of the pulse generators oscillating at controlled frequencies. Complex data information signals w are then obtainable at the output of the switch 16. The decision circuit 17 (described below with reference to FIG. 7) then converts these data information signals into complex data words c, the decision circuit operating essentially to replace each complex data word w by the most closely approximated complex reference data word c.

Figure 2:
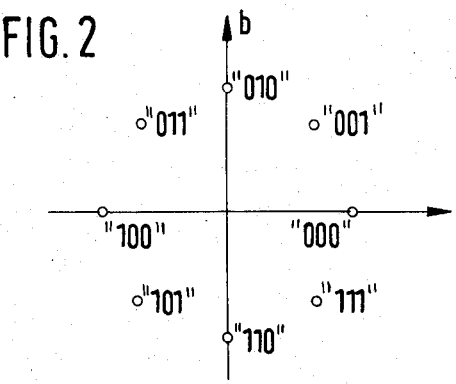
FIG. 2 is a graph of the complex variable kind of a two-dimensional signal space or 8-step phase shift keying transmission.

In FIG. 2 there are shown the position of complex data words that are selectable in the case of 8-phase modulation. The real part a is shown in the abscissa of the graph and the imaginary part b on the ordinate. A possible prescribed relation between the complex data c to binary information is thereby provided which can be built into the decoder, since the 8 possible complex words constitute an "8-level code" for which a binary code equivalent can be established corresponding to the encoding used in transmitting (recording).

Figure 3:
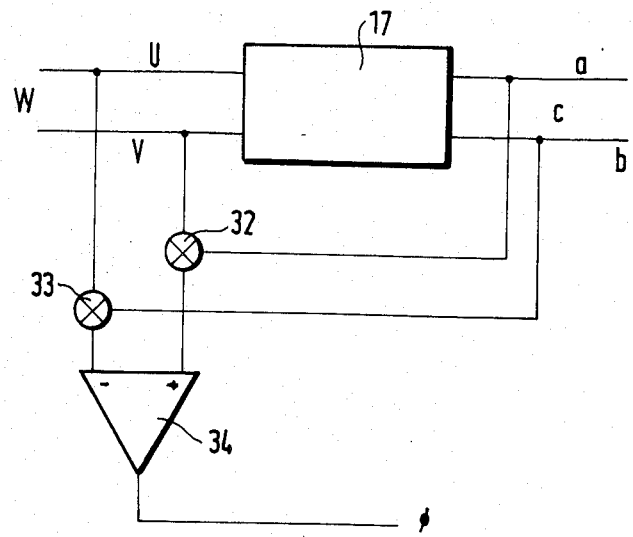
FIG. 3 is a circuit block diagram of an embodiment of a clock pulse timing control circuit.

The clock pulse recognition unit 18 is shown in more detail in FIG. 3. Timing recognition must be capable of obtaining information regarding timing shift not fully regulated out by the timing control loop from the optimum sampling instant for error-free recognition of the data. This timing shift arises in audio frequency tape recorders both from possible differences in the recording and playback speed and also from tape jitter. The criterion for deriving the timing is obtained from the complex data words w as they appear before the decision circuit and from the output signals c resulting from the operation of the decision circuit 17. In this regard, the same criterion previously used for carrier frequency control (compare for example Kammeyer, Schenk, Theoretische und Messtechnische Untersuchungen zur Tragerphasenregelung in Digitalen Modems, AEU, Vol. 34, No. 1 (1980), pp. 1-6) is used here for the first time for controlling clock pulses. This reference is also translated in the appendix at the end of this specification. The use of the known carrier frequency control criterion in the present invention for controlling clock pulses by pulses detected from a tape record has been found to be possible as the result of the synchronism between clock pulses and recorded carriers which is preserved undistorted in magnetic tape recording. This criterion can be obtained most simply with two multipliers 32 and 33, with the multiplier 32 being supplied at its inputs with the imaginary part v of the pre-decision complex data and the real part a of the post-decision data. The multiplier 33 is, conversely, supplied at its inputs with the real part u of the pre-decision data w and the imaginary part b of the post-decision data. As shown in FIG. 2, the post-decision complex data c may be referred to as a sequence of signal points.

A subtraction circuit 34 is connected in such a way that the output signal of the multiplier 33 is subtracted from the output signal of the multiplier 32. A control magnitude $\phi$ is thus made available at the output of the subtractor 34. This control magnitude is directly proportional to the residual timing shift, because in this receiving circuit the processing is performed within the bandpass region and synchronism between carrier frequencies and sampling frequency is maintained. The control magnitude thus obtained with the circuit unit 18, which can be positive or negative, is then added to the stored previous signal A present in the storage circuit 22. This is performed by the addition circuit 21 of FIG. 1. The resulting control signal A serves to provide a control correction to the pulse generator 12. The control correction loop of the pulse generator 12, however, operates only relatively slowly on account of the filter constants and the processing interval required by the decision circuit 17. It is therefore suitable only for dealing with slow (long) changes. Such slow changes can result, for example, from slowly changing playback speed of the magnetic tape equipment 10. Because of the relatively strong tape jitter, loops involving substantial delay must be avoided in the timing of the receiver. The heretofore available control is therefore not sufficient.

What is desirable is a correction for sampling instant error at the output of the receiving filters 14 and 15, so that the signals can be corrected immediately preceding their supply to the switch 16. The solution of the problem lies in modifying the filters 14 and 15 so that the propagation time of the signals through the filters changes. In that way it is possible to switch in different filters 14 and 15 on the basis of the control signal A and thereby to regulate out even rapid timing deviations such as occur from tape jitter.

Figure 4:
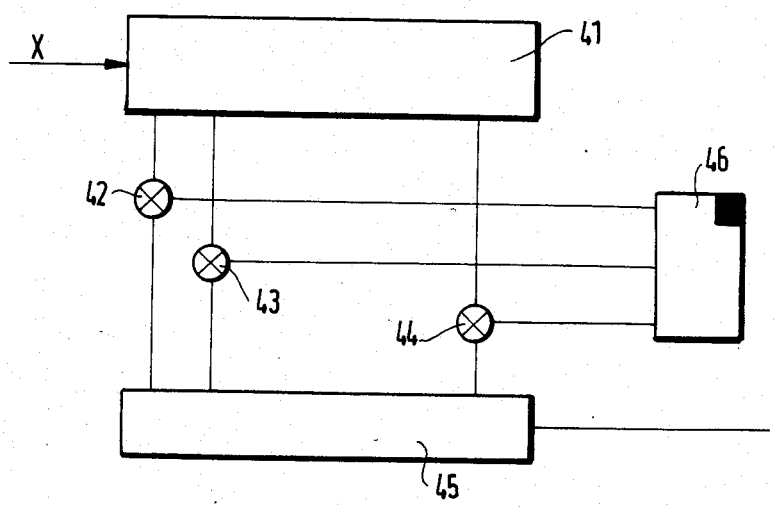
FIG. 4 is a circuit block diagram of a non-recursive filter.

FIG. 4 shows a non-recursive digital filter of the kind in question, the design of which is described in the publication of H. Schenk, Entwurf von Sender- und Empfangsfiltern fur den Einsatz in Digitalen Modems, Archiv fur Elektronik und Ubertragungstechnik, vol. 33 (1979) No. 11, pp. 425-431. Text of this reference is also translated in the appendix at the end of this specification.

The digital signal x is put into a shift register 41, to the many outputs of which multipliers are respectively connected, only part of these being shown at 42, 43 and 44. Second inputs of the multipliers are respectively connected to outputs of a fixed value storage unit (ROM or PROM). The outputs of the multipliers 42-44 are supplied to an addition circuit 45, at the output of which the real part of the complex data is made available for supply to the switch 16, for example (the imaginary part can be similarly obtained). The details of the timing correctable filters 14 and 15 for the real and imaginary parts of the complex data can be found in the above-cited technical literature which is hereby incorporated by reference.

When there is no timing control signal A, the filter of FIG. 4 has a propagation time behaviour that is substantially determined by the "basic" receiving filter coefficients which are provided to the multipliers by the ROM (subject to variation by the control signal A when such a signal is present). In order to change the propagation time of the filter, additive coefficients are provided along with the prescribed "basic" filter coefficients, these additive coefficients in each case being suited to correct distortion of the data channel differing from each other in their propagation time by steps of some predetermined value. The extreme values of delay are related to the maximum expectable tape jitter of the tape machine 10.

Figure 5:
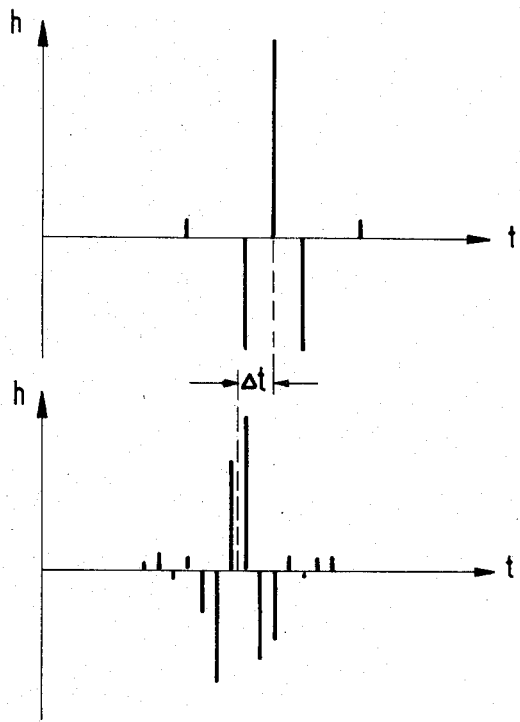
FIG. 5 is a time-against-amplitude diagram of the pulse responses of filters having different group propagation time.

In response to the timing correction signal A, filter coefficients which differ from each other are called out from time to time from the ROM 46 which influence the filter propagation time. Only a single ROM 46 is necessary to provide, along with the original set of coefficients, the necessary additive coefficients for the operation of the filters 14 and 15. Since the storage element that determines the state of the filter is not completely switched over to a new set of coefficients, but is merely subject to incrementation or decrementation of the coefficients, there are no transient oscillations at the instants of switching filter propagation time. FIG. 5 shows the pulse responses for the same signal value spectrum at different values of group velocity of the filter.

Only delays within the limited region for which the sets of coefficients are provided can be regulated out by this quick-acting propagation time control. Long period time errors are supplementarily compensated out by the corrective sampling time shift of the analog-to-digital converter 11 which is superimposed upon the propagation time control. In other words, a slower timing control modifying the frequency of the pulse generator 12 is superimposed upon the quick timing shift correction by change of the coefficients and consequent control of the propagation time of the filters 14 and 15. In this way both rapid signal changes resulting from jitter and also signal changes resulting from variations of tape speed can be detected and corrected.

Figure 6:
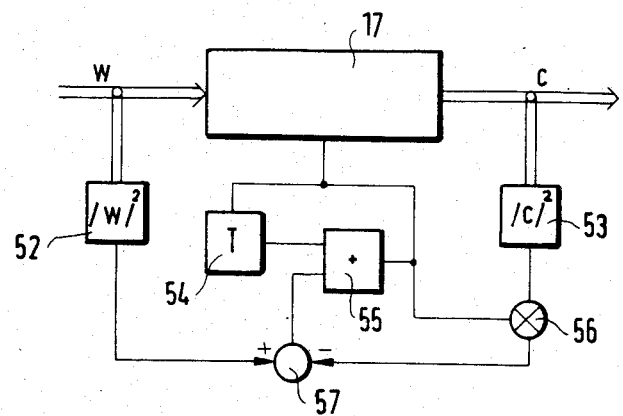
FIG. 6 is a circuit block diagram of a signal amplitude control system.

Along with jitter, magnetic data recording produces rapid amplitude fluctuations resulting from dust particles on the tape or spots of heavily worn tape material. These fluctuations are particularly disturbing when attempts are made to utilize stepwise amplitude modulation for raising the transmission rate. FIG. 6 illustrates the case of the decision circuit 17 when it is equipped with an amplitude control circuit. A criterion for amplitude control is obtained for this purpose from the difference of the absolute value (modulus) squares of the complex data respectively at the input and at the output of the decision circuit 17. For this purpose the squaring circuit 52 is provided to which the complex data signal w is supplied, at the output of which the square of the absolute or modulus value are made available by the use (not shown) of separate multipliers for the real part u and the imaginary part v which multiply these parts with themselves and an addition circuit (not shown) for adding the outputs of these two multipliers together. In the same way, the square of the absolute or modulus value of the complex data word c at the output of the decision circuit 17 is formed in a corresponding but different circuit 53. This is because the modulus of c is constant (it is the radius from the origin to the eight data points in FIG. 2). The output of the modulus squaring circuit 52 is supplied directly to an addition circuit 57, whereas the output of the squared-modulus signal source 53 is first supplied to a multiplier 56, the product output of which is supplied to a negative input of the addition circuit 57. The output of the addition circuit 57 is supplied to one input of the addition circuit 55 which has another input connected to a storage unit 54 which has an input connected to the output of the addition circuit 55. The output of the addition circuit 55 is, furthermore, supplied to the input of the multiplier 56 and as an output of the amplitude control system just described, also to an amplitude control input of the decision circuit 17.

It is possible in principle to change the data word w in its amplitude with the control magnitude obtained in the above-described manner. The illustrated control system is based on the idea of using only the known predetermined value $/c/^2$ for calculating the control criterion. This is made possible by the use of the multiplier 56 which the result is obtained that the output value of the unit 53 is multiplied by the same value which is supplied to the decision circuit 17. This correction value is in general smaller than 1. The value thus corrected is compared with the output signal of the unit 52. If deviations from the desired controls are still present, the correction is carried further. This is accomplished by adding in further correction signal, which is available at the output of the addition circuit 57 to the past value stored in the storage unit 54. In this way, modification of the decision criterion upwards or downwards is possible, which goes both into the decision circuit 17 and as a correction to the output value of the unit 53 applied through the multiplier 56. Improvement of control behaviour can be obtained by interposing still another multiplier between the addition circuit 57 and the addition circuit 55, so that the output value of the addition circuit 57 can be multiplied by a constant "weighting" value. By these arrangements, control behaviour can be modified in case of an amplitude dropout. The control arrangement according to FIG. 5 has the effect that, corresponding to the amplitude behavior of the input signal w, the awaited signal c is controlled in its amplitude. In this way it is also possible to handle input signals w correctly when these are very weak and far different from the original reference value c.

Figure 7:
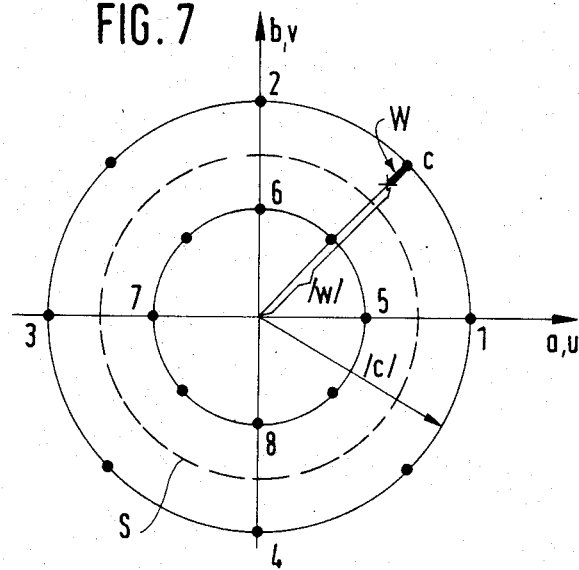
FIG. 7 is a graphical representation similar to FIG., 2 for multi-step modulation in which amplitude shift keying is superimposed upon 8-step phase shift keying.

The above-described operation will now be described more fully with reference to FIG. 7, which shows the possible positions of the signals w and c in complex number representation, for the case in which a two-level amplitude modulation has been superimposed upon an 8-step phase modulation. In such a case the data transmission rate is increased by 33%, since in comparison with the example of FIG. 2 the transmission of 8 additional complex signal points c is possible. The distinction to be made with reference to amplitude is carried out by determining whether the signal exceeds or fails to reach a threshhold value S. In this type of data transmission it is essential to recognize whether an amplitude lapse has taken place or not, since in the latter case the threshhold S could be modified by means of a regulation circuit according to FIG. 6, for example, in the decision circuit 17. The task of the decision circuit 17 is to assign an exact value c to the recorded and received magnitude w. This is performed by determining in the decision circuit 17 which value c is closest to the received value w. FIG. 7 shows by way of example a value w, which is somewhat too small, to which the corresponding value c is assigned. The received value w in general deviates from the corresponding value c on the basis of adjacent-character interference, noise or uncompensated linear distortion, to a greater or less extent. The quality of data transmission can be evaluated in terms of the size of this deviation. It is the better, the smaller the deviation is.

FIG. 8 shows by way of example a flow diagram of the steps performed in a microprocessor-controlled decision circuit 17 for assigning a complex datapoint c to a received complex data value w. For simplification of the diagram, however, only a four-step phase modulation is assumed. The resulting points which are selectable according to the flow diagram of FIG. 8 are designated with numerals 1 to 8 in FIG. 7. Each of the branching points of the FIG. 7 diagram represents a numerical comparison of interrogation, the result of which determines which of two downward-going branches of the diagram will be followed. In the first comparison 60 it is determined whether the real part u of the received data is greater than 0. If so, it is then determined, at 61, that only the points 1, 2, 4, 5, 6 and 8 could possibly be assigned. Then at 62 it is determined whether the imaginary part v of the received data is greater than 0. If this is the case, it is determined at 67 that now only the points 1, 2, 5 and 6 could be assigned. Then at 68 it is determined whether the imaginary part v is smaller than the real part u of the received data. If that is the case, only the point 1 or point 5 could be assigned, as shown at 69. If v is not smaller than u, on the other hand, only the points 2 or 6 remain in question as shown at 70. Whether point 1 or 5 is to be assigned or whether point 2 or 6 is to be assigned is essentially dependent upon the amplitude threshhold prescribed for the decision circuit 17. If a negative answer is provided to the question at 62, then as noted at 63 only the points 1, 4, 5 and 8 come into question. A decision thereon accordingly proceeds at 64 that determines whether the imaginary part v is smaller than the negative real part u. If that is the case, either the point 4 or the point 8 is to be assigned as shown at 68 and if the condition in question is not satisfied, only the point 1 or the point 5 is to be assigned, as shown at 65.

The decision criteria here illustrated make it possible to obtain an unambiguous relation and assignment whenever the received points w do not fall directly on the boundaries but in the vicinity of the expected point. If the condition that u be greater than 0 is found (at 60) not to be fulfilled, the left branch of the flow diagram comes into effect. In this case, as shown at 72, the points 2, 3, 4, 6, 7 and 8 are the only ones remaining for selection. At 73 it is determined whether the imaginary part v is greater than 0. If this is the case, only the points 2, 3, 6 or 7 are selectable as shown at 81. At 82 it is determined whether the imaginary part v is smaller than the negative real part u. If that is the case, only the points 3 or the point 7 remain selectable and otherwise only the point 2 or the point 6 may be selected. If the question considered at 73 is negatively answered, only the points 3, 4, 7 or 8 remain in question as shown at 74. At 75 it is determined whether the imginary part v is smaller than the real part u of the received complex data signal w. If this is not the case, a selection between the point 3 and the point 7 is indicated as shown at 76. If this condition is fulfilled, however, then either the point 4 or the point 8 must be assigned, as shown at 77. The selection between the points 4 and 8 takes place, as in the case of other choices between only two points remaining selectable, by comparison with the threshhold value S for the absolute or vector magnitude. For this purpose the absolute value (modulus) of the complex data signal w is calculated and compared with the prescribed threshhold to determine whether or not it is smaller than the threshhold. If that is the case, as shown at 79, the point 8 is assigned since, as shown in FIG. 7, it is below the threshhold S in absolute value. The square of the modulus w is calculated in connection with amplitude control and therefore does not need to be calculated again for the last step of the decision circuit 17. The flow diagram for the decision circuit 17 shows that the essential interrogation criteria are independent of amplitude, so that small amplitude fluctuations themselves have no influence on the process of selecting among possible outputs. The individual points 1 ... 8 correspond to the complex datawords c that are provided at the output of the decision circuit or supplied to the decoder 19.

Reference is made to the above-cited articles in the technical literature for the details of the decoder 19, in which respect also the cited literature is also hereby incorporated by reference.

Although the invention has been described with reference to a particular illustrative example, it will be understood that modifications and variations are possible within the inventive concept.

There now follows an appendix in which German language articles cited above are translated.

TECHNOLOGICAL APPENDIX

A. Text of 1979 article by Kammeyer and Schenk, published in "FREQUENZ".

1. Digital apparatus has attracted increasing interest in connection with the objective of efforts in recent years in many places to increase further the speed of transmission of data over telephone channels. There are two reasons for this: First, various problems of rapid data transmission such as post generation and adaptive elimination of distortion can sensibly be solved only on a digital basis and, second, the introduction of this circuit technology is economically interesting because of the rapid technological development. The problem of successfully providing digital systems for rapid data transmission can of course not yet be regarded as fully solved. It is especially to be noted that in seeking optimal structures the direct digitizing of an analog circuit does not as a rule lead to the best solution. In order to clear up at the outset related questions of structures, favorable algorithms, necessary word lengths, etc., simulation runs are usually performed of a kind which invites the use of a universal computer up to a certain point because of its great flexibility. On the other hand there are a series of problems in such simulations. This is reported in detail in reference [1]. Only the necessity of going without a real time run is mentioned here as an example, whereby real transmission channels need to be replaced by models which as rule cannot show all the phenomena that occur.

Such problems can be largely avoided by the use of the experimental systems here described: The apparatus has the advantage of free programmability up to a certain degree and, on the other hand, corresponds essentially to the specific apparatus which is to be developed in terms of realization and speed of operation. Investigation regarding real transmission lines are possible with this; the quality of transmission can be directly ascertained by meansurement technology.

Following an overview of the whole system there will be explained the manner of operation of individual components such as transmitter, receiver with demodulation and decision circuits as well as adaptive distortion eliminators. The important problems of carrier and clock timing derivation must be excluded here on account of the wide scope of the matter.

Figure 9A:
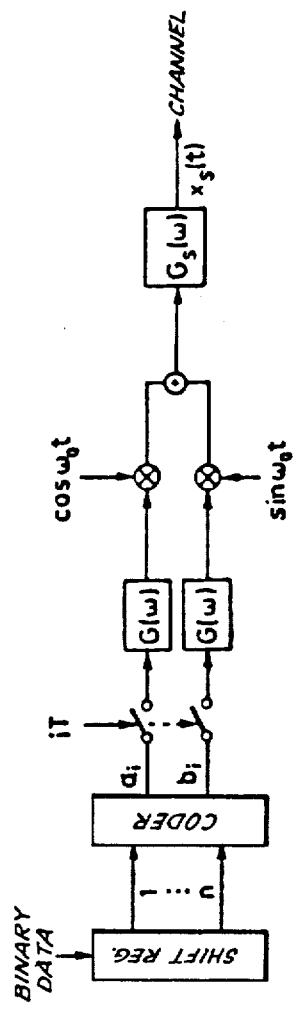
Figure 9B:
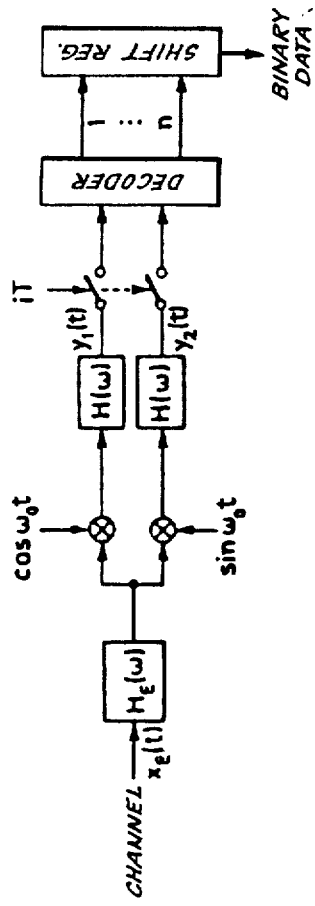

2. Overview of the whole system 2.1 Conversion of transmitter and receiver structure One proceeds first from the known basic structure of a general transmission system for any desirable linear kind of modulation (FIGS. 9a and 9b of the specification, corresponding to FIG. 1 of the article). Serial binary data arriving in the transmitter are first put together in groups of n bits and supplied to a coder, which delivers a number pair $a_i$, $b_i$ according to an unambiguous and reversible scheme. These values $a_i$, $b_i$ can be understood as Cartesian coordinates of points in the signal plane; the coder thus already fixes the form of modulation. After scanning in step-by-step rhythm and low-pass filtering by two identical pulse shapers having the transmission function $G(\omega)$ the modulation takes place by multiplication with the carrier oscillations cos $\omega_0 t$ and sine $\omega_0 t$. A further filter with the transmission function $G_s(\omega)$ serves, if necessary or desirable, for suppression of one sideband in vestigial sideband transmission. In this case $d_i \equiv 0$ is to be set. The receiver constituted in mirror image to the transmitter: after input filtering described by $H_E(\omega)$, the incoming signal is multiplied with sine $\omega_0 t$ and cosine $\omega_0 t$. Two identical lowpass filters with the transmission function $H(\omega)$ serve for filtering out the baseband signal, which after scanning and decoding again leads to the binary data.

A completely digital circuit of the described transmission system is directly obtainable if the individual components, such as filters, multipliers, etc. are embodied by corresponding digital elements. For reasons that are discussed further on, it is nevertheless found desirable to carry out a conversion of such a kind as the series of multiplications and filtering at the transmitter and at the receiver can be interchanged.

For that purpose the transmitter side is first considered. The output signal $x_S(t)$ can be expressed in complex variables as follows:

$$x_S(t) = Re\left\{ \sum_{i=-\infty}^{\infty} c_i[g(t - iT)e^{-j\omega_0 i T}]*g_S(t) \right\} \quad (1)$$

in which $c_i = a_i + j\, b_i$ and $g(t)$ and $g_S(t)$ are the pulse responses of the filters having the transmission function $G(\omega)$ and $G_S(\omega)$.

If one defines $$e(t) = e_1(t) + je_2(t) = [g(t)e^{-j\omega_0 i T}]*g_S(t) \quad (2)$$

as a complex elementary signal, there results after simple calculation from (1):

$$x_S(t) = \sum_{i=-\infty}^{\infty} Re\{c_i e^{-j\omega_0 T i} e(t - iT)\}. \quad (3)$$

The above formulation has become known under the name "digital echo-modulation" from references [2–4]. It states, in essence, that the complex data value $c_i$ is rotated with every clock beat by a fixed angle $\phi_i = \omega_0 T i$, where $\phi_i$ is obviously determined by the frequency ratio of carrier and step character frequencies. Then the complex elementary signal, in which the effect of all filters of the transmitter has been taken into account, is weighted with this rotated data value. The desired interchangeability of complex multiplication and filtering is thereby obtained.

At the receiver a corresponding conversion is possible: The output signal of the two lowpass filters, according to FIG. 9b written in complex notation as $$y(t) = y_1(t) + jy_2(t) = [(x_E(t)*h_E(t))e^{+j\omega_0 t}]*h(t) \quad (4)$$

with the received signal $x_E(t)$ from the channel and the pulse responses of the receiving bandpass and lowpass filters $h_E(t)$ and $h(t)$.

By elementary calculation one obtains from (4) the expression $$y(t) = [x_E(t)*h_E(t)*(h(t)e^{-j\omega_0 t})]e^{+j\omega_0 t}. \quad (5)$$

Therefore, if the two lowpass filters with the transmission function $H(\omega)$ are replaced by a pair of filters with the complex pulse response $$h(t) = h_1(t) + jh_2(t) = h(t)\cos\omega_0 t - jh(t)\sin\omega_0 t, \quad (6)$$

then according to (5) the interchanging of the sequence of multiplication and filtering is carried out also at the receiver.

The above considerations lead to a modified block diagram for the transmission system. The structures here reproduced in FIGS. 10a and 10b (FIG. 2 of the original article) have a series of favorable properties. With regard to a distortion elimination compromise, the elementary signal synthesis at the transmitter makes available simple possibilities of corrective predistortion without any additional expense worth mentioning, regarding the method of which there is a report in reference [5]. For reasons of compatibility with existing data receivers, however, this process will not be usable as a rule.

Figure 10A:
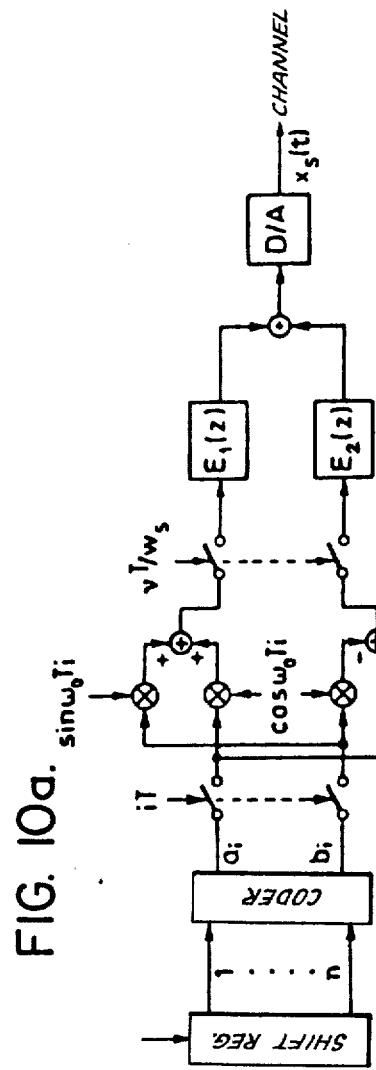
Figure 10B:
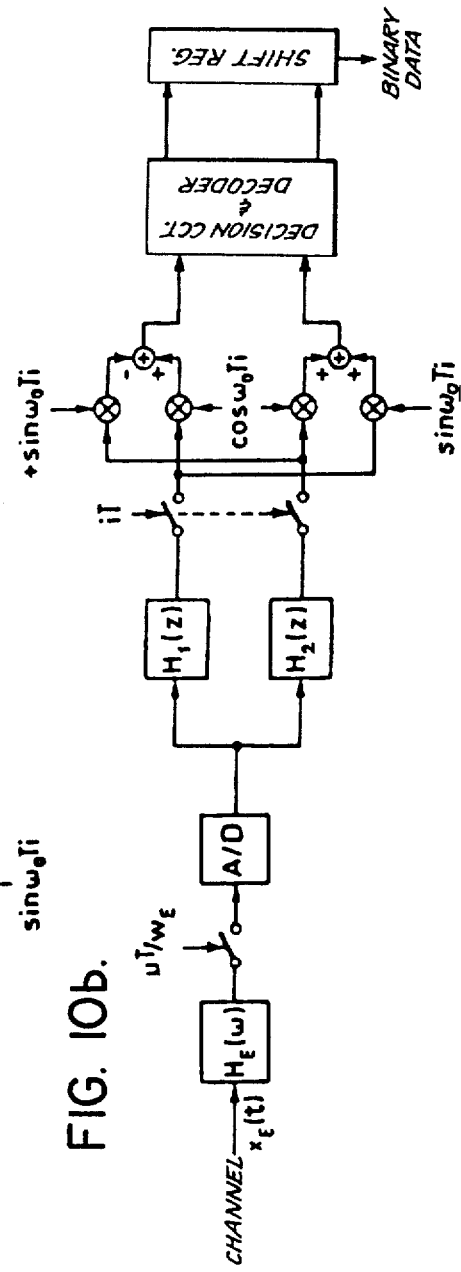

The advantages of the structure according to FIGS. 10a and 10b compared with a digital embodiment lie primarily in the reduction of the working speed of individual component circuit blocks. Thus at the transmitter and receiver the number of multipliers is in each case doubled; because of the reduction of the multiplication speed by the factors $w_S$ (=number of sample values $e(\nu\tau)$ per step period) or $w_E$ (=number of filter sample values per step period). The overall number of multiplications per step (character) cycle is nevertheless reduced as a rule. The expense reduction becomes even more clear when the conventional four multipliers for the complex rotation are replaced by a very much more favorable iterated algorithm, which completely gets rid of multiplications; compare Sec. 3.1.1. In this case a fixed number of iterations are necessary, independently of whether input or output indicators represent real or generally complex magnitudes. In this case, therefore, a multiplication time gain by the full factor $w_S$ or $w_E$ is obtained by the interchange of the multiplications and filtering.

A further substantial advantage is the small number of carrier phase positions necessary as the result of the reduced sampling rate (it is assumed that there is a rotational carrier to step frequency ratio). In many cases this leads to noticeable simplifications. Consider in this regard, as example, the usual 4.8 kbit/s transmission with 8 PSK at a step (character) speed of 1.6 kBaud and a carrier of 1.8 kHz. The necessary correction rotation of the signal space points around the angle $$\phi_1 = 2\pi f_0 Ti = \frac{9}{4} \pi i \qquad (7)$$

leads again in every step period to one point of the 8-phase raster, so that it is possible to dispense entirely with complex multiplication; the modulation is obtained by simple code conversion.

The example just considered leads directly to the following observation: the rotations in the phase plane at the transmitter and receiver can be regarded according to FIGS. 10a and 10b as belonging to the coder or decoder; they are to be seen in general as mere code conversion of the signal space points, depending upon the step pulses, i.e. as negative rotation at the transmitter and positive rotation at the receiver. If one leaves out of consideration, for once, the question of the compatibility with conventional apparatus, the rotation operations on both sides can be eliminated without modification of the overall behavior of the system. In this manner a very simple version of a transmission apparatus, essentially consisting of a coder and an elementary signal generator at the transmitter and a filter pair with following decoder on the receiving side is arrived at. For reasons of compatibility, however, this simple procedure will not be usable in most cases.

2.2 Principal possibilities of the realized system.

2.2.1 Specification of the transmitter.

The basic structure of the modulator is, in implementation, generally fixed by digital echo-modulation; all interesting transmission parameters, on the other hand, are variable. The entirely free choice of modulation form is important in this case: it can be fixed by an erasable PROM, which contains the Cartesian coordinates (word length in each case 8 bits) for the signal space points used for transmission. At a maximum, a total of 64 points in a field of 256×256 discrete raster points can be represented.

A further PROM contains the sample values of the elementary signals and thereby the effect of all transmitter filters. The pulse shaping at the transmitter can accordingly be varied in any desired manner; limitations exist only in the maximum number of 128 sample values per elementary signal and in the sample density of $w_S$=4, 6, 8 or 12 sample values per step pulse. The sample values are coded with 8 bits.

Usually the values for character rate (step rate), bit rate and carrier frequency are delivered by an internal quartz controlled generator (accurate to $10^{-5}$), as shown in Table 1; They can also be supplied from outside the apparatus, so that transmissions deviating from the existing norm may be possible.

TABLE 1

| Character Rate | Carrier Frequency | No. of Steps | Bit Rate | CCITT | Mod.-Form |
|---|---|---|---|---|---|
| 1,2 kBaud | 1,8 kHz | 2 | 1,2 kbit/s | V.26 | 2DPSK |
| | | 4 | 2,4 kbit/s | V.26,V.27 | 4DPSK |
| | | 8 | 3,6 kbit/s | | |
| | | 16 | 4,8 kbit/s | | |
| | | 32 | 6,0 kbit/s | | |
| | | 64 | 7,2 kbit/s | | |
| 1,6 kBaud | 1,8 kHz | 2 | 1,6 kbit/s | | 8DPSK |
| | | 4 | 3,2 kbit/s | | |
| | | 8 | 4,8 kbit/s | | |
| | | 16 | 6,4 kbit/s | | |
| | | 32 | 8,0 kbit/s | | |
| | | 64 | 9,6 kbit/s | | |
| 2,4 kBaud | 1,7 kHz (1,8 kHz) | 2 | 2,4 kbit/s | V.29 | 4DPSK |
| | | 4 | 4,8 kbit/s | V.29 | 2ASK/ |
| | | 8 | 7,2 kbit/s | V.29 | 8DPSK |
| | | 16 | 9,6 kbit/s | | 3ASK/ |
| | | 32 | 12,0 kbit/s | | 8DPSK |
| | | 64 | 14,4 kbit/s | | |

In order to make comfortable test operation possible, the transmitter contains various internal data sources (511 pseudo-random sequence, settable continuously transmitted individual points, periodical transmission of an isolated single pulse). Data input from external apparatus is selectably possible with either internal or external clocking.

The recommendations of CCITT (V.29) serve as orientation for a preliminary run for synchronization of timing pulses and carrier as well as for intializing the adaptive distortion corrector on the receiver side. The preliminary run consists of four different segments [6] which in the present apparatus can be programmed by a PROM in length and in the selection of the transmitted signal space points. For test purposes the periodic repetition of individual segments as well as also of the entire preliminary run is possible, as for making visible the start-up behavior of the distortion eliminator.

2.2.2 Specifications of the receiver

The basic structure of the demodulator derived in Section 2.1 was the point of departure for implementation. For the digital embodiment of the filter pair with the transmission functions $H_1(z)$, $H_2(z)$ there are different basic possibilities; some of those are brought together in Table 2.

TABLE 2

A few possibilities of filter embodiments for the receiver structure of FIG. 10b

| No. | Filter Type | Advantages | Disadvantages |
|---|---|---|---|
| 1 | non-recursive bandpass $h_1(t) = g(t) \cos \omega_0 t$ $h_2(t) = -g(t) \sin \omega_0 t$ | linear phase, multiplication in character rate | two different filters (with common state register), high filter degree |
| 2 | non-recursive Hilbert-transformer for $H_2(z)$, simple delay for $\underline{H}_1(z)$ | linear phase, multiplication in character rate, $\underline{H}_1(z)$ without expense | high filter degree |
| 3 | recursive quadrature | very low filter degree | phase distortions, error, behavior |

TABLE 2-continued

A few possibilities of filter embodiments for the receiver structure of FIG. 10b

| No. | Filter Type | Advantages | Disadvantages |
|-----|-------------|------------|---------------|
|     | network of all-pass filters |  | (noise, limit cycles), great internal word length, two different filters with separate state memories |

In a recently published work [7] filter type 1 was used, i.e. the version resulting directly from the derivation in Section 2.1. It could be shown there that by taking concrete values for sampling frequency, character rate and carrier frequency, the cost of such a non-recursive filter pair can be substantially reduced. On the other hand, the transmission parameters remain fixed with such a favorable filter design; for a flexible experimental system the generally applicable alternatives 2 and 3 therefore offer more. In this respect it it necessary to observe the principal difference between these two variants: non-recursive systems are, as known, to be designed strictly for linear phase. The required 90° phase difference between the two output signals must then be maintained exactly, whereas in the case of a recursive network it needs only to be approximated; the phase of a single channel, moreover, is distorted here. On the other hand, the course of amplitude is exactly constant in a recursive all-pass design, which can be only approximately fulfilled with non-recursive filters. With regard to the implementation expense, type 3 appears to be very attractive on account of the very low filter degree (compare Section 3.2.1).

In the present system, for this reason, this version was implemented (compare also [8]). Besides, there is still the possibility to add on also an external filter—e.g. a two-channel non-recursive filter.

Figure 11:
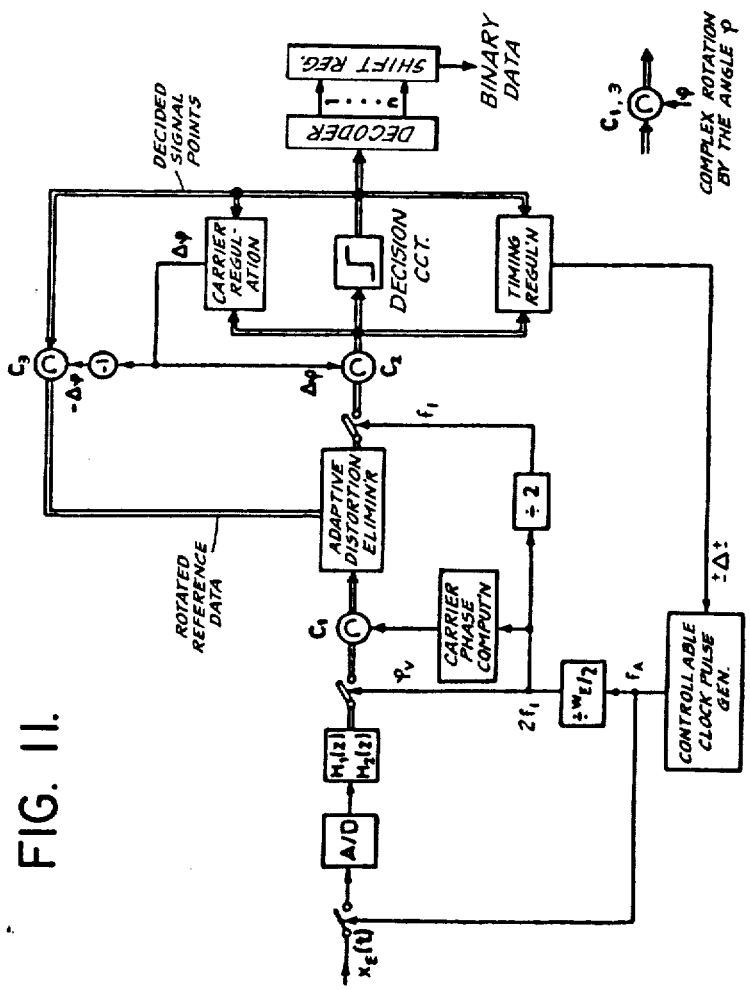

Up to now the considerations involved exclusively the favorable implementation of a digital demoduation circuit. The complete receiver system must, beyond that, deal with the problems of adaptive distortion elimination, decision making, and derivation of timing and carrier frequency. In FIG. 11 [FIG. 3 of the original article] there is shown the circuit block diagram of the completely assembled basic structure of the receiver.

There can be seen the circuit blocks for the adaptive distortion eliminator, the decision circuit and the timing and carrier regulation along with the demodulation circuit with the filter pair and the related complex rotation diagram. The additionally required character rate (frequency $f_T = 1/T$) and if necessary the double character rate (for distortion eliminator with double sampling) are obtained directly by frequency division of $f_A$ (possible division factors $w_E = 4, 6, 8, 12$). With the present $f_T$ (or $2f_T$) the carrier phases $\phi_\nu = 2\pi\nu f_0 T$ (or $\phi_\nu = \pi\nu f_0 T$ for double sampling) at the transmitter can be directly obtained in the receiver in the case of synchronous transmission. With this carrier, the arriving signal in the network $C_1$ is first demodulated. If now frequency jumps appear, the carrier frequency here used does not agree exactly with the carrier frequency in the arriving signal, so that the complex signal appearing at the output of the network $C_1$ as a rotation overlaid with a frequency corresponding to the frequency jumps.

Figure 12A:
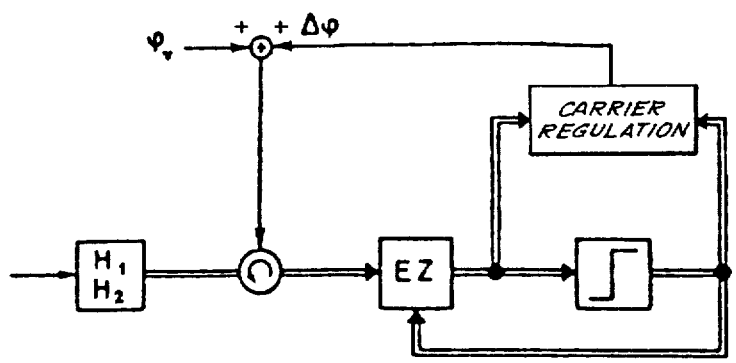
Figure 12B:
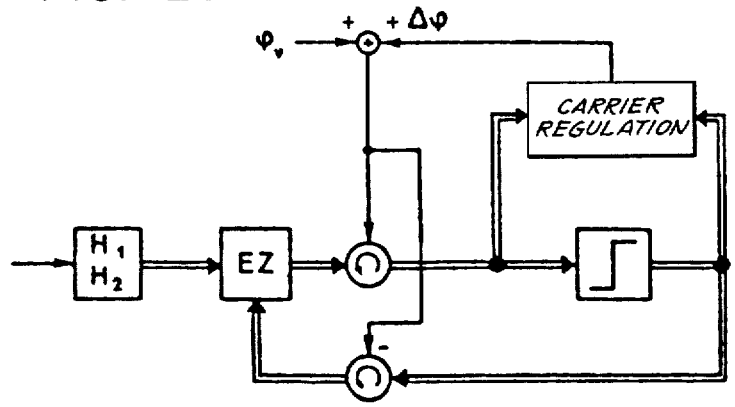
Figure 12C:
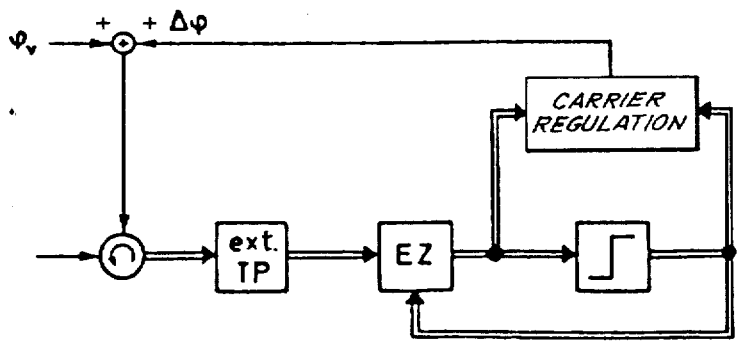

This rotation is compensated in the network $C_2$ following the distortion eliminator. In this manner the regulating loop for calculating the correction phase $\Delta\phi$ does not contain the delays of the distortion corrector and therefore has the necessary speed of operation. The output signal $C_2$ can be provided to the decision circuit after compensation of the frequency discontinuities. Finally a third network $C_3$ is still necessary in order to put back into rotation the resulting comparison data for the adaptive operation in the distortion eliminator, corresponding to the signal at the input of the distortion eliminator. In the implementation of the present receiver system emphasis was put on the fact that other structures varying from FIG. 1 can be constructed; a few examples are brought together in FIGS. 12a, 12b and 12c (FIG. 4 in the original article). Thus, for example, a bandpass distortion eliminator version can be constituted by interchanging the sequence of $C_1$ and distortion eliminator (FIG. 12b). Furthermore the connection of external filters is prepared so that for example the operation of the conventional structure (FIG. 12c) is possible. The illustrated receiver thus presents a very flexible experimental system which also makes possible the comparison of different structures.

3. Description of component systems 3.1 Digital data transmitter [9,10]

3.1.1 Rotation of the phase plane

For implementation of the signal space rotation an iterative method is attractive which was published a few years ago under the name CORDIC (COordinate Rotation DIgital Computer) [11]. This is based on the concept that the original complex vector rotates stepwise by particular angular quantities into its next position each time in such a way that on the one hand the sum of the angular quantities leads to the desired aggregate rotation and on the other hand the angular quantities can be calculated by very simple transformations of coordinates. The iteration equations below as (8). The number n of iterations is fixed by the desired precision [12].

| | |
|---|---|
| input vector: | $a + jb$ |
| rotation angle: | $\phi$ |
| initial step (90° rotation): | $d_0 = \text{sgn}\,\phi$ |
| | $a_1 = -d_0 b$ |
| | $b_1 = +d_0 a$ |
| | $\phi_1 = \phi - d_0 \pi/2$ |
| Iteration: | $\nu = 1, \ldots, n - 1$ |
| | $d_\nu = \text{sgn}\,\phi$ |
| | $a_{\nu+1} = a_\nu - d_\nu b_\nu 2^{1-\nu}$ |
| | $b_{\nu+1} = b_\nu + d_\nu a_\nu 2^{1-\nu}$ |
| | $\phi_{\nu+1} = \phi_\nu - d_\nu \arctan 2^{1-\nu}$ |
| output vector (after $\underline{n}$ steps): | $a_n + jb_n = K(a + jb)e^{\pi}$ |

The arithmetic functions necessary here are addition, subtraction and division by powers of 2, thus simple shift operations. There also comes into play the provision of the values of arctan $2^{-i}$ by means of an ROM. The CORDIC algorithm therefore replaces the four multipliers necessary in conventional implementations, replacing them by a sequence of very simple operations. A further important advantage of the method is the direct input of the angle of rotation $\phi$. The provision of sine and cosine generators is eliminated in favor of the much simpler carrier phase calculation by accumulation of the phase increments $\Delta\phi = \omega_0 T$.

A particular property of the CORDIC method is the magnitude increase of the vector in the course of the iteration process by the fixed growth vector $$K = \prod_{i=1}^{n-1} \sqrt{1 + 2^{2(1-i)}}.$$

The usually required correction multiplication with $1/K$ is not necessary in the present application, because the absolute deviation range of the transmitter output signal is of little interest. For a favorable scaling for activating the digital-to-analog converter care needs to be taken in any case by corresponding programming of signal space and elementary signal PROMs. The present apparatus operates with an internal word length of 12 bits for input and output word lengths of 8 bits each. The number of iterations is fixed at $n=10$.

3.1.2. Elementary signal synthesis

If one writes $\widetilde{a}_i$ and $\widetilde{b}_i$ for the coordinates of the rotated signal space vector at the output of the CORDIC network, then for calculating the transmitter output signal according to (3) we have to solve $$x_S(t) = \sum_{i=-\infty}^{\infty} [\overline{a}_i e_1(t - iT) + \overline{b}_i e_2(t - iT)]. \quad (9)$$

Taking account of a digital implementation we proceed by way of an infinite sample sequence for the elementary signals:

$$e_\nu = e_{1,\nu} + je_{2,\nu} = \begin{cases} e(\nu\tau) \text{ for } 0 \leq \nu < Mw_S \\ 0 \text{ otherwise} \end{cases}. \quad (10)$$

with $\tau = T/w_S$ (sampling interval of the transmitter output signal).

By means of (9) there is obtained the relation:

$$x_S\{(kw_S + \nu)\tau\} = \sum_{i=0}^{M-1} \{\overline{a}_{k-j} e_{1,jw_S+\nu} + \overline{b}_{k-1} e_{2,iw_S+\nu}\}; \quad (11)$$

$\nu \in \{0, 1, \ldots, w_S - 1\}, k \in Z.$

This relation is distinguished from the usual folding equation of a non-recursive filter to the extent that here only M values $\{e_\nu, e_{w_S+\nu}, \ldots, e_{(M-1)w_S+\nu}\}$ are brought into play in each case for computing a sample value for a pulse response of the aggregate length $M w_S$.

The cost for the implementation of (11) therefore is determined less by the absolute length of the elementary signals than from their length with reference to the step rate interval.

The assumption of definite transmission parameters can here lead in particular cases to notable simplifications as already shown in the consideration of complex rotation. For example the illustration treated in Section 2.1 of a 4.8 kbit/s transmission leads to the values $\overline{a}, \overline{b}, \epsilon\{0, \pm 1, \pm\sqrt{2}/2\}$, so that in the storage of elementary signals in two different scalings $e_1$, $e_2$ and $\sqrt{2}/2$ $e_1$, $\sqrt{2}/2$ $e_2$, and with the implementation of addition and subtraction, all multiplications can be eliminated entirely.

Figure 13:
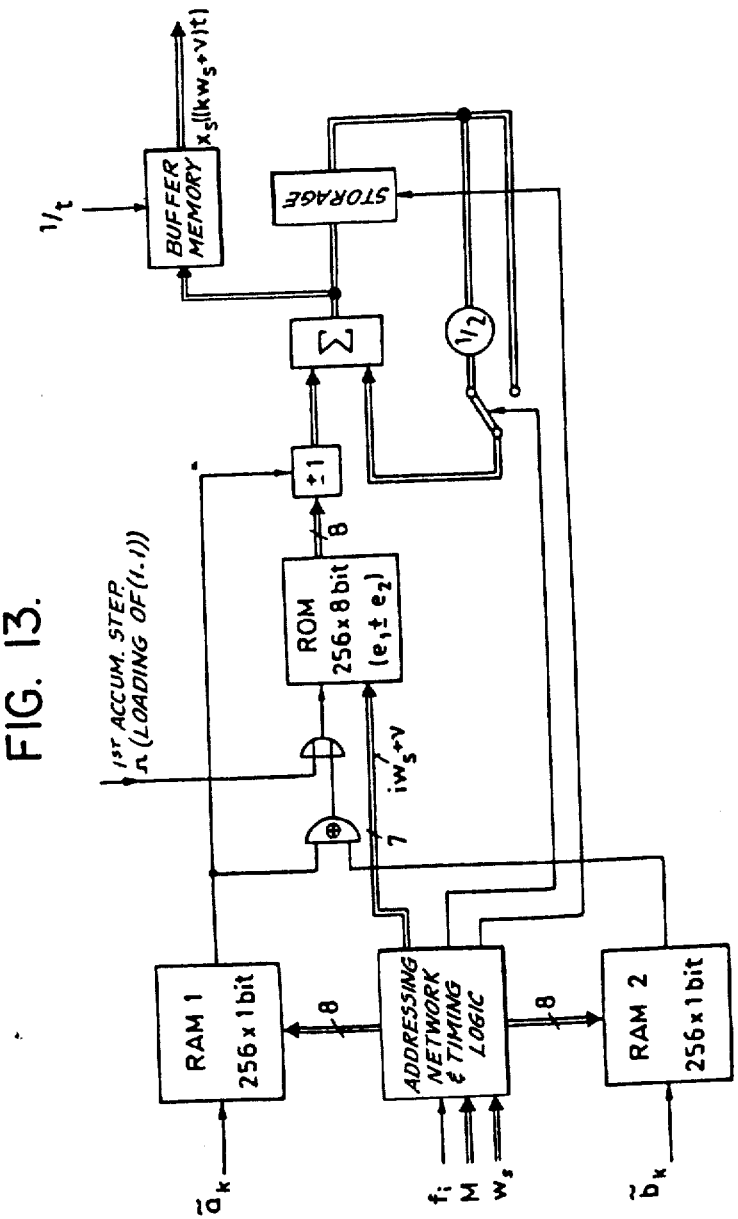

In the construction of a flexible experimental system, however, equation (11) in its general form needs to be solved, i.e. there must be calculated the sum of the aggregate of 2M products of the respective $\widetilde{a}_{k-i}, \widetilde{b}_{k-i}$ with the respective coefficients $e_{1,\nu}, e_{2,\nu}$. For this task that frequently arises in signal processing, a favorable method of evaluation was recommended in a series of works in the technology of distributed arithmetic [4, 13–16]. In this treatment, conventional multipliers are replaced in a known way by a fixed storage device (ROM) that contains the coefficient combinations of the form $e_{1,\nu} \pm e_{2,\nu}$ (the aggregate storage capacity required is for 2M $w_S$) and accumulator providing division by 2 in the carry-back branch. The basic circuit block diagram of the elementary signal generator in distributed arithmetic (modified form [15]) is reproduced in FIG. 13 (FIG. 5 of original article).

The data storage is provided here by two RAMs, each of the 256×1 bit kind, out of which M values
$\overline{a}_{k-i}$ and $\overline{b}_{k-i}$ ($i \in \{0, \ldots, M-1\}$)
are read out serially in every cycle. Since the word lengths for $\overline{a}_k$ and $\overline{b}_k$ is fixed at 8 bits, it is plain that a maximum elementary signal length of $M=32$ character intervals (step intervals) is obtainable ($M\epsilon\{8, 16, 24, 32\}$).

The coefficient storage is constituted of a PROM of the 256×8 bit size. With a resolution of 8 bits elementary signals of maximally 128 sample values are thus processed. The sample density in this case varies while an auxiliary condition is maintained by which $M\omega_S \leq 128$ ($\omega_S \epsilon\{4, 6, 8, 12\}$). The accumulator that follows first works out the bit-offset accumulation for the distributed arithmetic and superimposes thereon the M partial sums (carry-back switchable over: factor ½ and 1).

Coefficient storage, fixed value storage and accumulator are then activated through the above-identified address network and the timing pulse generation. To calculate an output value there are altogether 8M calculation cycles; the internal operating rhythm frequency is accordingly $f_1 = 8 M w_S/T$ (e.g. $1/T = 2,4$ kBaud, $M w_S = 128 \rightarrow f_{imax} = 2.5$ MHz).

3.2 Digital receiver [17]

3.2.1 Quadrature network

It is necessary to provide an allpass network that delivers two signal relatively offset in their phase by 90° in a predeterminable frequency region. Solutions for this task are well known in the technical literature [18] for the analog case. For defining corresponding digital systems it is possible to proceed from such projects—it is a matter of cascades of allpass first degree filters; the filter coefficients are obtained, for example, by bilinear transformation [19].

Figure 14:
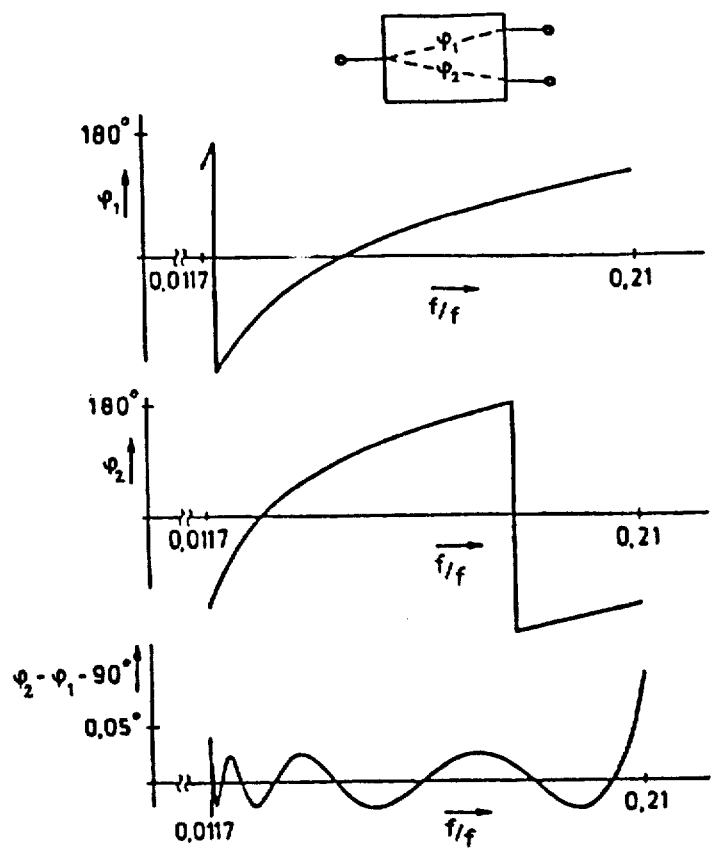

It appears that already with very low degree systems the fulfillment of the phase condition is obtainable with great accuracy. In FIG. 14 (FIG. 6 of original article) the phase course of the two branches of an allpass network (each branch of fourth degree) are shown, as well as the difference phase. The 90° phase difference is in this case required in the frequency range $0.015 \leq f/f_A \leq 0.17$, corresponding to the limit frequencies $f_u=300$ Hz and $f_0=3.4$ kHz at a sampling frequency $f_A=20$ kHz. The 90° phase offset is maintained with an accuracy of 0.024°.

Distributed arithmetic offers a way of constituting the allpass filters, which on account of the special form of the differential equation of an allpass block of the second degree great simplifications result $$y(k) = c_0[u(k) - y(k-2)] + c_1[u(k-1) - y(k-1)] + u(k-2). \quad (12)$$

Figure 15:
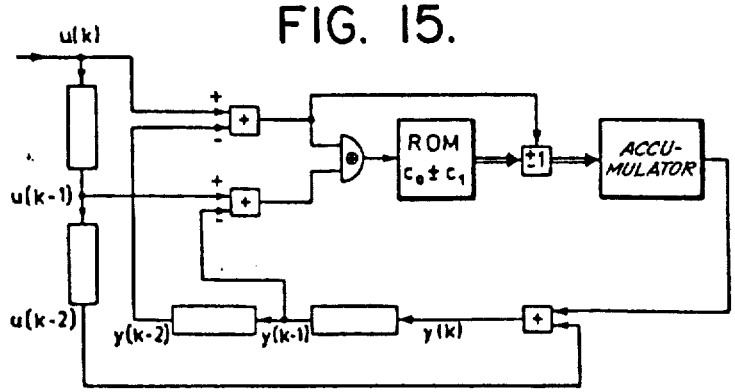

FIG. 15 (FIG. 7 of the original article) shows the basic circuit diagram of a block of the second degree. The variables $u(k)$ and $y(k-2)$ or $u(k-1)$ and $y(k-1)$ are preliminarily subtracted and then processed in distributed arithmetic. The input magnitude $u(k-2)$ are then added to the partial results thus obtained. The aggregate ROM storage capacity for a block of the second degree therefore requires only two values $[c_0+c_1, c_0-c_1]$.

In the present apparatus the sets of coefficients of altogether three different selectable allpass designs are stored in fixed storage (two systems of sixth degree, one system of fourth degree). They can furthermore be varied by interchanging the coefficient PROMs as may be desired. The maximum sampling frequency of the filter is 20 kHz. The internal word length is fixed at 12 bits.

3.2.2. Complex rotation operators

In the basic structure of the receiver there are altogether three complex rotation operations to be carried out. In the present apparatus these functions are again implemented according to the CORDIC method, by which such a network is run through in threefold time multiplex. Here also the direct input of the rotation angle (instead of trigonometric functions) is of great advantage: the carrier phase $\phi_\nu$ is directly obtained by accumulation; the carrier regulation algorithms usually likewise deliver directly the correction phase $\Delta\phi$, so that the provision of a cosine/sine table is not necessary and that trouble is saved.

It was already mentioned in Section 3.1.1 that the rotation of complex vectors according to the CORDIC method involves a growth factor K; with 10 iteration steps K=1.6468. In carrying out the three rotation operations in the receiver it is particularly important to direct attention at the required correction multiplication: in the networks $C_1$ and $C_2$ a correction can be safely omitted just as in the case of the transmitter, since the growth factor K can be compensated for by corresponding scaling of the quadrature network or by suitable storage of reference data in the decision circuit. The rotation operator $C_3$, on the other hand, which delivers the reference data to the distortion eliminator, the scaling of which reference data must match that of the distortion eliminator output data, requires a fixed value multiplication. The problem is substantially simplified, however, by the fact that at the input of $C_3$ the signal points selected by the decision circuit are present, as value pairs of a finite supply of $2^n$ data. The necessary fixed value multiplication can then be replaced, for example, by a supplementary storage of the reference data of corresponding scaling in the decision circuit. Genuine multiplications are thus not necessary even in the receiver in the carrying out of three complex rotations.

In Section 2.1 the low sequence rate of the complex rotation operations was mentioned as a substantial advantage of the present receiver structure. Accordingly the algorithms for $C_2$ and $C_3$ run at the step rate (character rate). For the network $C_1$ the double step rate would be required with reference to a distortion eliminator with double sampling. In the present apparatus, however, the subsampling is carried out only at the input of the distortion eliminator, while $C_1$ still operates in the sampling frequency $f_A = w_E f_T$. The reason for this lies definitively in an obvious demonstration possibility, for example of visible patterns or signal space representations with transitions between the signal points (compare Section 4).

3.2.3 Decision circuit.

Algorithms for recognition of the data in the arriving signal are usually based on stepwise processing down of a decision tree. For that purpose the plane of the signal point is subdivided into suitable decision regions; by a sequence of simple interrogations, the data point value having the greatest probability of corresponding to the transmitted data point is determined. Such methods of processing are naturally dependent upon the point distribution that is used. In the present experimental system a decision algorithm should be found that is fully independent of the form of modulation. As a decision criterion there is available the Euclidean distance between the receive point and the reference point: After running this signal space points, that one is selected to which the shortest spacing corresponds.

The exact calculation of the Euclidean distance requires the relative large expense of two calculations of squares, which, moreover, lead to a doubling of the word lengths:

$$r^2_\epsilon = \Delta a^2 + \Delta b^2. \quad (13)$$

For that reason, a simply obtainable approximation of the Euclidean norm is desirable. Calculation schemes have been found useful which are limited to forming the absolute value, finding a maximum and division by a power of 2:

$$r_P = \text{Max}\{|\Delta a|, |\Delta b|\} + 2^{-g}\text{Min}\{|\Delta a|, |\Delta b|\}; \, p \epsilon N_\theta. \quad (14)$$

Figure 16:
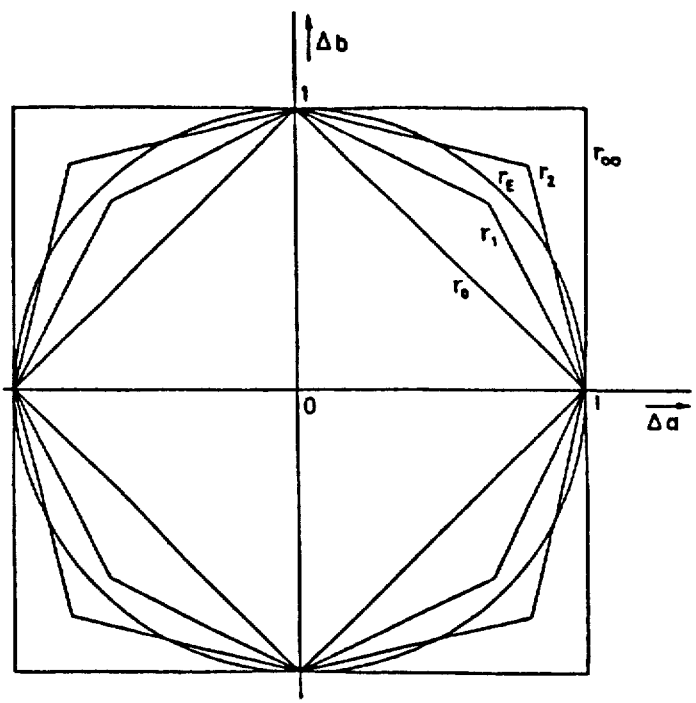

FIG. 16 (FIG. 8 of the original article) makes clear the approximation of the Euclidean norm by the calculation scheme (14) for various values of $\phi$.

In the present equipment $\phi=1$ was chosen, since $r_1$ leads to the smallest maximum spacing from $r_E$.

The decision algorithm is thereby independent of the signal space constellation; the coding used at the transmitter is supplied to the decision circuit through a PROM, with the number of signal points being limited to a maximum of 64.

3.3. Adaptive distortion eliminator 3.3.1 Distortion eliminator structure

For elimination of linear distortion of the transmission system, the provision of an automatic or adaptive distortion eliminator is necessary especially for high transmission speeds (beginning at about 4.8 kbit/s). In the present experimental system the transversal structure was selected.

Figure 17:
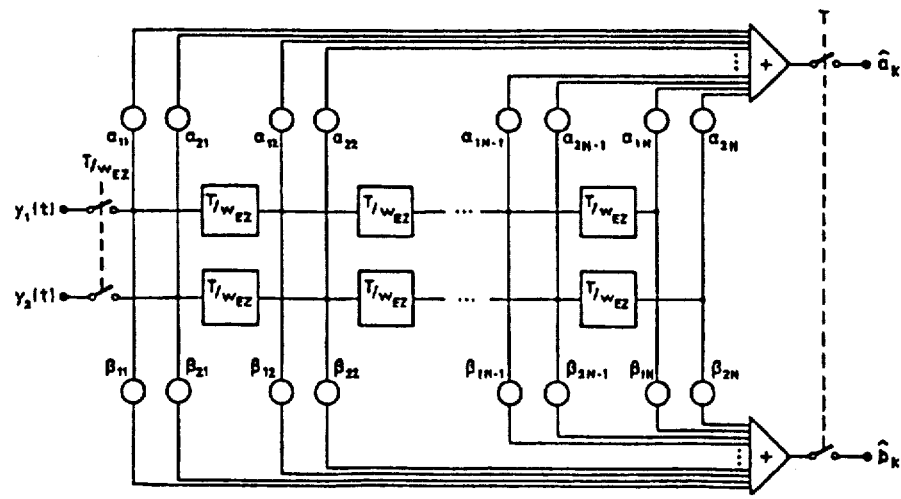

FIG. 17 (FIG. 9 of the original article) shows a general non-recursive distortion eliminator structure for eliminating distortion from general phase modulation systems.

In this case, at a time separation $T/w_{EZ}$ the signal values of the two demodulator outputs are supplied to the non-recursive distortion eliminator; $w_{EZ}$ therefore designates the number of sample values per step interval at the input of the distortion eliminator. After one non-recursive filtering (four partial filters), the undistorted values $\bar{a}_k$ and $\bar{b}_k$ are available at the distortion eliminator output at the step rate $f_1$. The operating speed of the distortion eliminator is therefore determined, even in the case of multiple sampling, exclusively by the step speed of the transmission system.

The usual echo distortion eliminator is contained in this general structure as a special case with $w_{EZ}=1$. The advantages of the distortion eliminator structure having $w_{EZ}>1$ (e.g. $w_{EZ}=2$) have been many times reported in the technical literature. Mention is made here only of the small sensivity regarding the position of the instant of sampling [20] and the possibility of a theoretically exact distortion elimination in a system described by a rational transmission function [21, 22].

In order to make possible an optimal distortion removal in the case of channel distortions which are unknown as well as changing with time, it is necessary to set in the distortion elimination coefficients automatically and regulate them adaptively in operation. For this purpose the setting in of the coefficients of the gradient algorithm has been found highly favorable [23, 24]. For the scheme of setting in the coefficients of one distortion eliminator branch, the following holds: [22]

$$a_v(v+1) = (1-g)a_{ij}(v) - \gamma \Delta a_{ij}l\left(k+z-\frac{j}{w_{EZ}}\right)T \quad (15)$$

$j = 1, \ldots, N$
$x =$ delay of the system as a whole.

With $a_{ij}(v), j=1, \ldots, N$, are designated the distortion eliminator coefficients of the $v$th iteration step. The correction or manipulated magnitude $\gamma$ influences the start-up speed of the distortion corrector. For reasons of stability it may not exceed a maximum value which is determined by the transmission system, the step speed and the distortion eliminator structure. The noise figure of the distortion eliminator can be influenced by the magnitude $\epsilon$. In a hardware implementation it is necessary to limit the calculation of the distortion eliminator coefficients to a finite averaging time L T, L$\epsilon$N. A compromise must be found in this case between necessary accuracy and adjustment speed.

In the case of ideal phase modulation systems, there are the following coefficient symmetries:

$$\alpha_{vj} = \beta_{zj}, j=1, \ldots, N \quad (16a)$$

and $$\alpha_{zj} = -\beta_{98}, j=1, \ldots, N, \quad (16b)$$

of which account can be taken in the calculation of the distortion eliminator coefficients.

3.3.2 Implementation of the distortion eliminator [25]

Figure 18:
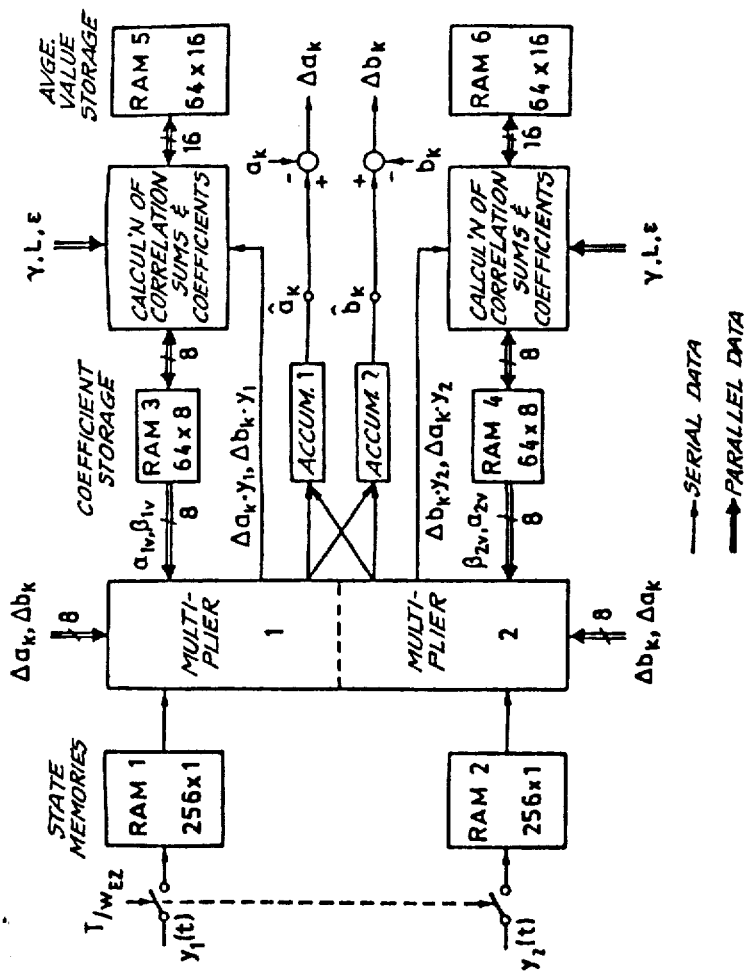

Maximum flexibility was sought in the design of the distortion eliminator. In order nevertheless to limit the circuit expense to an acceptable magnitude, the design proceeded on the basis of a maximum distortion eliminator length of 32 coefficients per branch and an 8-bit word length for coefficients or state variables. For reasons of operating speed it was necessary to include two series-parallel multipliers (Am25LS14), which work in time multiplex operation. FIG. 18 (FIG. 10 of the original article) shows a hardware structure of this embodiment of the distortion eliminator.

The running control of the distortion eliminator can be subdivided into two cycles, the distortion removal cycle and the correlation cycle. In the distortion removal cycle the state variables (RAM 1 and RAM 2) are multiplied with the distortion eliminator coefficients. At the output of AKKU 1 and AKKU 2 the two dedistorted value sequences $\bar{a}_k$ and $\bar{\beta}_k$ are obtained. The actual elimination of the transmission channel distortion takes place here. In the following correlation cycle the state variables are multiplied with the deviations $\Delta a_k$ and $\Delta b_k$ and the correlation sums necessary to the calculation of the coefficients according to (15) are stored in RAM 5 or RAM 6. On account of a maximum calculation time of 128 step periods a word length of 16 bits was chosen for the partial sums.

For reasons of flexibility it is also provided in this system for operation without taking account of coefficent symmetries. That makes necessary a storage space capacity of $6 \times 64 \times 8$ bits for coefficients and correlation sums. A maximum of 256 multiplications may be carried out during one step.

For the distortion eliminator embodiments the structure providing $w_{EZ}=1$ and $w_{EZ}=2$ was provided. The two structures differ essentially only in the different sampling rate of the two input value sequences. As a result there is the possibility to observe the behavior of these two structures in direct comparison.

In practical operation the coefficients for the particular transmission channel in use must be calculated during the relatively short start-up phase of the distortion eliminator. During this training phase the transmitted data received in the receiver are known; this is referred to as automatic operation of the distortion eliminator. During the actual data transmission the comparison data must be obtained by the use of a decision circuit (compare Section 3.2.3). In this adaptive phase of the distortion eliminator only slowly changing channel distortions can be eliminated. In order to make possible an optimal operation of the equipment it is useful to change the distortion eliminator parameters, such as manipulated variable and calculation time, according to operating conditions. In the distortion eliminator here described these parameters can be set at the front panel independently of each othe both for automatic and for adaptive operation modes.

For special investigations with this embodiment of distortion eliminator it is possible, in addition to using a selection which to a great extent is unfettered for distortion eliminator length, calculation time and manipulated variable magnitude, to provide reduction of the word length from 8 bits to 1 bit for the error $\Delta a_k$ or $\Delta b_k$ for calculation of the correlator sums. The various setting possibilities and variation regions of the present distortion eliminator are gathered in Table 3.

TABLE 3

Variation region of the distortion eliminator parameters and setting possibilities for the distortion eliminator embodiment

| | |
|---|---|
| DE-structure: | $W_{EZ} = 1, W_{EZ} = 2$ |
| DE-length: | $N = 1, \ldots, 32$ coefficients |
| Calculation time LT: | $L = 2^\lambda; \lambda = 0, 1, \ldots, 7$ |
| Manipulated $\gamma$: variable | $\gamma = \gamma_0 2^{\lambda-\mu} 0 \leq \gamma_0 < 1$ $\mu = 0, \ldots, \lambda$ |
| Reduction $\epsilon$: magnitude | $\epsilon = 0, 2^{-6}, 2^{-5}$ |
| Word length shortening for $\Delta a_k$ or $\Delta b_k$: | 8,7,6, ..., 1 bit |
| Coefficient symmetry: | with/without |
| Operation mode: | automatic/adaptive |
| Correlation: | with/without |

The switching over from automatic to adaptive operation can also take place with special control signals of external apparatus. Two different complete sets of coefficients can be supplied as initial operation coefficients from an erasable PROM.

For measurement and demonstration purposes, a total of three digital to analog converters is provided. It is possible thereby to provide an analog output and to make visible on the oscillograph screen, selectively, the distortion eliminator output data $a_k$ and $b_k$ or the deviations $\Delta a_k$ and $\Delta b_k$ as well as individual and freely selectable distortion corrector coefficients or a full set of coefficients. A few of the measurement results obtained with the distortion eliminator here described are reproduced in the following section:

4. A few oscillograms obtained with the system.

Figure 19:
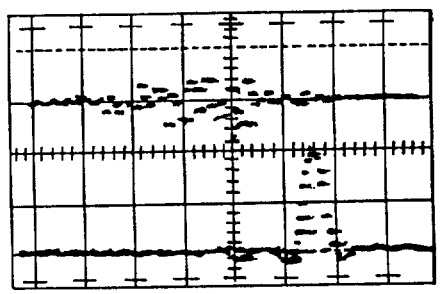

FIG. 19 (FIG. 11 of the original article) shows the transmitted elementary signal $e_f(v\tau)$ (sampling frequency 9.6 kHz) and the related reaction at the output of $C_1$ ($f_A = 19.2$ kHz). The elementary signal was developed according to [4] for a 2.4 kBaud transmission over 3 TF paths. The artificial line TLN-1 of the firm Wandel & Goltermann [26] was used as the channel model.

With the use of 3 TF sections of the apparatus here used the received pulse is very nearly freed from distortion.

Figure 20A:
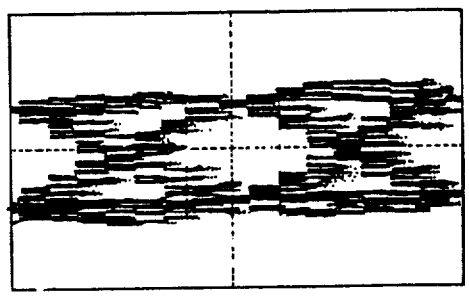
Figure 20B:
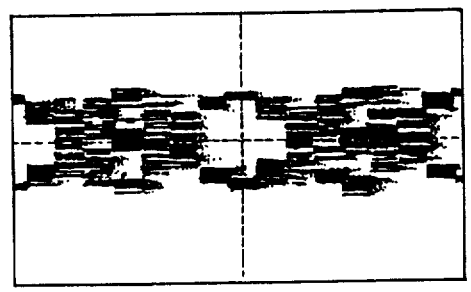

With these elementary signal developments (models) a two-stage data transmission over 3 TF paths were carried out at a step velocity of 2.4 kBaud. FIG. 20a (FIG. 12a of the original article) shows the measured viewing diagram at the output of $C_1$ (normal branch) with conventional modulation and demodulation, whereas in FIG. 20b (12b of the original article) the complex rotation at the transmitter and receiver was suppressed (compare Section 2.1). The viewing diagram makes visible here the bandpass character of the output signal of $C_1$; in the sampling instants k T, the same conditions (results) are obviously produced in both cases.

Figure 21:
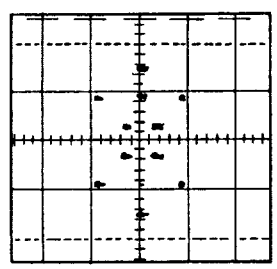
Figure 22:
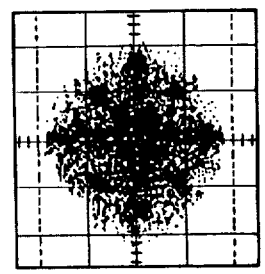

In FIG. 21 (FIG. 13 of the original article) there is reproduced the signal space distribution of the 16-step 9.6-kbit/s transmission according to V.29 on the transmitter side. The signal pattern arising at the output of $C_1$ in the receiver shows the transitions between the signal points on account of the processing with the sampling frequency $f_A$ (FIG. 22, original FIG. 14: transmission over 3 TF paths, $f_A = 19.2$ kHz).

Figure 23A:
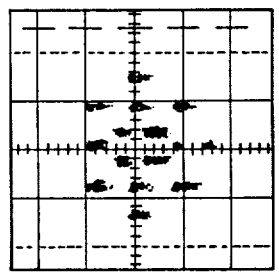
Figure 23B:
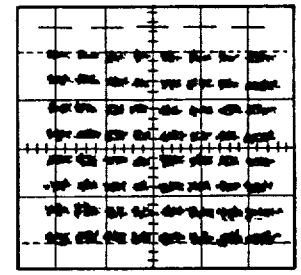

FIG. 23a (FIG. 15a in original article) shows the signal space at the output of the distortion eliminator ($w_{EZ} = 2$) with transmission over 6 TF paths, under automatic operation; FIG. 23b (15b in the original article) shows the example of a 64-step transmission with 14.4 kbit/s likewise at the distortion eliminator output (6 TF paths). The predistorted elementary signals shown above for 3 TF paths were used as the transmitter pulse in this case.

Figure 24:
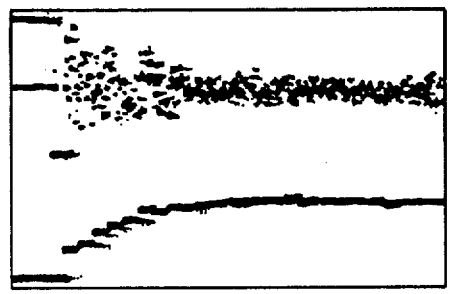

Finally, two start-up curves of the distortion eliminator during sending of the preamble according to V.29 is reproduced in FIG. 24 (FIG. 16 of original article). The upper part of the oscillogram shows the course of the deviation $\Delta a_k = \bar{a}_k - \bar{a}_k$ during the start-up run, the lower part shows the behavior of the coefficients $a_{1.22}(v)$ with L=16 calculations per iteration.

The references (untranslated) cited in the articles all appear at the end of the specification.

Method of Carrier and Timing Wave Regulation in Synchronous Data Transmission by G. Schollmeier and N. Schatz (1977)

0. Introduction

The desire for higher transmission speeds in data transmission systems provides a need for transmission methods of the greatest possible capacity for fitting the data signal to the transmission channel which is most commonly an analog channel. Synchronous transmission methods with coherent demodulation at the receiver have therefore acquired particular importance. In order to utilize the capability of such a method, it is necessary to generate at the receiver both a demodulation carrier and timing for sampling which must agree with the transmitting carrier for transmitting timing, as the case may be in their respective frequencies and the phase of which must be regulated in an optimal manner according to the properties of the transmission channel.

The timing rhythm determines, at the receiver, the instant at which the arriving signal is sampled and is transmitted to a decision stage in order to recover the transmitted information. In what follows it is investigated to what extent it is possible to derive the necessary carrier or timing signal without supplementary information from the transmitted data signal. Accordingly those methods are consciously disregarded which require special transmitted signals, such as pilot tones, for their operation, since it is precisely in the case of higher utilization of the transmission channel that it is undesired to use up to transmission capacity for such supplementary signals.

1. Evaluation criteria for regulation

In order to be able to compare different regulation methods, it is first necessary to consider how the quality of a regulation method can usefully be measured. A common and at least qualitative measure is the phase jitter of the regulated signal about its mean value. The variance of the phase fluctuation, i.e. the mean square deviation from the stationary mean value, can be used as a corresponding quantitative measure.

Such a statement, however, still says little regarding the actual suitability of the regulation method for incorporation in a data receiver, for in our case the recovery of the carrier or of the timing is in no way a goal in itself, but rather serves merely as means for recovering the transmitted information. In order to recognize, therefore, cases in which, for example, the variance of the received timing is small while the sampling is not yet taking place at the optimal sampling instant, we will conveniently measure the quality of our regulation method by the transmission quality obtained. A reliable measure for that purpose is the error probability, also with regard that this probability is most important for the user.

An analytic method for deriving more favorable values for the timing and carrier phase is available from the statistical estimation theory. With its help it is possible to derive maximum likelihood estimate values for both parameters, which values are optimal with reference to minimal error probability. When these estimate values are to be obtained by means of a practical circuit, simplifications are necessary (1–3). It is therefore necessary in every case to check the results to determine how far they are short of the theoretical optimum.

We shall accordingly proceed in a path that makes it possible for a development engineer to evaluate with regard to the possibility of obtaining a favorable practical embodiment, the implementation of a contemplated regulation method with all selected simplifications, without having to turn to time-consuming measurements. Since high-speed digital computers have been available the simulation on a digital computer of a problem highly unsuitable for ordinary analytic treatment is a powerful method for theoretical treatment of the problem. In our case that immediately offers the possibility of overdoing the good work. In other words, if we draw the statistical properties of the transmission channel into our simulation—e.g. by a simulation of Gaussian noise, and carry out this simulation with sufficient accuracy for the low bit error probabilities lying below $10^{-5}$ necessary in data transmission, the resulting computation times will usually exceed economic magnitudes. In practice the sample values of the received signal are therefore obtained by the simulation under the assumption of a time-invariant transmission channel which is merely under the influence of a time-dependent adjustment of the regulation under consideration. Then the error probability determining influence of noise is taken into account by analytic calculation of the error probability for the signal sample values calculated by the simulation. By this very procedure it will be frequently necessary, for reduction of the computation time, to approximate by simple functions, e.g. a step function, the distribution of the sample values resulting from the simulation [4].

2. Regulation methods for recovering the carrier.

Now that we have outlined in the foregoing section why the error probability is utilized for evaluating the regulation and how it can be practically calculated, we shall now indicate the regulation criteria which should evaluate their capabilities. For the selection of the regulation criterion we take advantage of the fact that at the receiver of a data transmission system the signal value resulting from the decision stage corresponds with high probability to the transmitted value. Such kinds of regulation that are coupled back to the decision circuit are substantially more powerful than those which do not utilize the available information [3]. In general, the following holds for a carrier frequency signal modulated in amplitude or in phase $$g_{TF}(t) = g(t) \cos \omega t + g^+(t) \sin \omega t, \tag{1}$$

where $\omega$ is the circuit or frequency of the carrier oscillation and $g(t)$ as well as $g^+(t)$ are determined by the selected pulse shaping and data sequence. The relation between $g(t)$ and $g^+(t)$ then determines the transmission method, e.g. whether an amplitude modulation signal with single sideband transmission, a phase modulated signal or some other signal is involved. If we demodulate the signal corresponding to (1) at the receiver with the orthogonal carrier oscillations $\cos(\omega t + \theta)$ and $\sin(\omega t + \theta)$, we obtained the result by neglecting, i.e. filtering out all except the sidebands of the two baseband signals $$g_{IB} = \tfrac{1}{2}(g \cos \Theta - g^+ \sin \Theta) \tag{2}$$

and $$g_{QB} = \tfrac{1}{2}(g \sin \Theta + g^+ \cos \Theta). \tag{3}$$

where $g_{IB}$ is the in-phase baseband signal and $g_{QB}$ is the quadrature baseband signal. Their explicit designation as time functions can now, as in what follows, be left out.

For further considerations we assume a phase modulated data signal. We need both $g_{IB}$ and $g_{QB}$ for determining the signal phase and from that the transmitted bits or, in the case of multistep, the transmitted bit combination. The function $g$ and $g^+$ then have the form [5]

$$g = \sum_{n=-\infty}^{\infty} \cos\theta_n p(t - nT), \tag{4}$$

$$g^+ = \sum_{n=-\infty}^{\infty} \sin\theta_n p(t + nT), \tag{5}$$

wherein $\theta_n$ designates the transmitted phase steps, $p(t-nT)$ are sample values of the pulse used for the transmission at the time $t$ and $T$ designates the step period. In the undisturbed ideal case and in the case of optimal sampling instants $t\pm iT$ only the values $p(t\pm iT)$ differ from zero. If with this assumption we determine the phase of the received signal $\theta_{E,i}$, we have the result by (2)-(5)

$$\theta_{E,i} = \arctan \frac{g_{QB}}{g_{IB}} = \theta_i + \Theta, \tag{6}$$

i.e. a phase rotated by the amount of the carrier phase error $\theta$. If our phase step is correctly detected (decided) from $\theta_{E,i}$, i.e. if it is equal to $\theta_i$, we then obtain a carrier phase error directly out of the difference $\theta_{E,i}-\theta_i$ can simply regulate in accordance with the relation $$\Theta_{new} = \Theta - \Delta \operatorname{sgn}(\theta_{E,i} - \theta_i) \tag{7}$$

wherein $\Theta_{new}$ is the new value of the carrier phase. The signum function is used to order to make possible a simple digital implementation; $\Delta$ designates the constant step width by which the carrier phase is changed.

We shall consider a further possibility for carrier phase regulation with the same example of phase modulation. If we multiply the in-phase signal $g_{IB}$ with that value of since $\theta_i$ which the quadrature signal takes on in the absence of carrier phase error $(\Theta=0)$ and under the assumption already used above, that only the value $p(t-iT)$ differs from zero, there is the result $$g_{IB,i} \sin \theta_i \approx \tfrac{1}{2}(\cos \theta_i \sin \theta_i \cos \Theta - \sin^2 \theta_i \sin \Theta). \tag{8}$$

Under the supplementary assumption that the transmitted phase steps were selected to be equidistant, e.g. $\theta_n(2n-1)\pi/n$ for an n-step signal, and all $\theta_i$ occur equally often and randomly distributed, we obtained, with summation over a sufficiently large number M of sample values $$\sum_{m=1}^{M} g_{IB,m} = \sin\theta_m \approx -\sin\Theta. \tag{9}$$

since the products $\cos \theta_m \sin \theta_m$ are equally often positive and negative on the average and for this reason drop out in the summation. Corresponding to this relation we can control the carrier phase with $$\theta_{new} = \theta + \Delta \operatorname{sgn} \sum_{m=i-N}^{i} g_{IB,m} \sin\theta_m \tag{10}$$

A substantial difference of the above compared to regulation according to (7) consists in that we can count on the disturbing content proportional to cos Θ will be sufficiently small on the basis of (8) only in the case of summation over a large number of sample values. Regulation according to (9) is therefore much less powerful than regulation according to (7), since the regulating magnitude has a high variance. We can improve the regulation decisively, however, if we multiply by sin $\theta_i$, not directly $g_{IB}$, but rather the error of the sample value $F_{IB,i} = g_{IB,i} - (\frac{1}{2}) \cos \theta_i$. We than obtain $$F_{IB,i} \sin \theta_i = \frac{1}{2}(\cos \theta_i \sin \theta_i (\cos \Theta - 1) - \sin^2 \theta_i \sin \Theta), \quad (11)$$

wherein the variance of the regulating magnitude is greatly reduced particularly for small carrier phase errors $\Theta \approx 0$. Regulation substantially improved in comparison with (10) is accordingly obtained by $$\Theta_{new} = \Theta + \Delta \text{sgn}(F_{IB,i} \sin \theta) \quad (10a)$$

The heretofore considered case of an ideal disturbance, free transmission practically never occurs. We shall only later consider the effect of linear distortions which appear preponderantly as disturbances especially in data transmission, since analytic methods are of little success and we still need to be concerned with the selection of suitable criteria for the timing regulation.

3. Regulation methods for recovery of timing.

Figure 25:
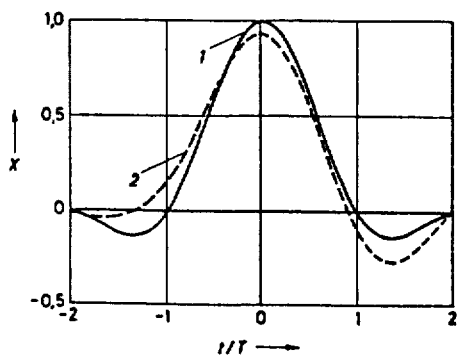

Just as in the case of carrier regulation it is also possible in the case of timing regulation to bring in the current decision regarding the incoming signal step in order to obtain the regulating magnitude. Compared with the carrier regulation, where in the ideal case of correctly adjusted carrier phase the disturbing component of the quadrature signal goes through zero, there is no so obviously desirable adjustment for timing regulation. For explanation, FIG. 25 (FIG. 1 of original article) shows an undistorted and a distorted raised-cosine single pulse [6] such as is often used for data transmission. If the undistorted pulse is sampled at the instants nT (where T is the step duration) the principal value of the pulse is sampled in the maximum, while all other sample values are zero. In the case of the distorted pulses these desirable properties no longer occur simultaneously, so that we must decide which property we should try to establish by the regulation.

One possibility would be to sample at the maximum. That appears not to be very useful, since the pulse shape has a flat course in the maximum, so that it is difficult to determine the exact sampling instant by reference to this maximum. Furthermore such regulation can also raise undesired problems [7].

It has been found better to regulate the timing in such a way that the sample values of the individual pulse (FIG. 25) take on equal values at the times ±T. In data transmission over real channels, however, the transmitted pulses are preponderantly so distorted that the first extreme value following the main value of the pulse takes on a particularly large value in comparison to the remainder of the precursor and trailing oscillations, as is also exhibited for the distorted pulse in FIG. 1.

In consequence the slope dp(t)/dt is particularly steep in the first null transition of the pulse following the main value and a deviation of the instant of sampling from this null transition is particularly critical. It is therefore obviously desirable to control the timing wave phase in such a way that sampling is done in this null transition [89. In the previously utilized example of phase modulation there is found for the error occurring because of a deviation from the null transition at $t_0$ in the ith sample value of the in-phase signal $$F_i \approx (t - t_0) \cos \theta_{i-1}, \quad (12)$$

wherein the pulse shape in the neighborhood of the null transition was approximated by a straight line. We obtained therefrom by multiplication with the value $\cos \theta_{i-1}$ known from the previous decision a signal proportional to the sampling time error, so that we can shift the timing phase $\Phi$ corresponding to $$\Phi_{new} = \Phi - \delta \text{sgn}(F_i \cos \theta_{i-1}) \quad (13)$$

wherein $\delta$ signifies the step width of the shift and the sgn-function, as in the previous case, is introduced to obtain a simple digital implementation.

Another particularly illuminating possibility which is often awkward in implementation, however, for timing regulation is offered by the so-called early-late process, as they also provide possible approximations of a maximum-likelihood regulation effect [2, 3]. The received signal is in this case sampled at two different instants $t - \Delta t$ and $t + \Delta t$. The errors $F_{+\Delta}$ and $F_{+\Delta}$ of these sample values, for example, can be determined therefrom and a shift can be made in the direction of the smaller error, e.g. corresponding to $$\Phi_{new} = \Phi + \delta \text{sgn}(|F_{-\Delta}| - |F_{+\Delta}|). \quad (14)$$

In the case of a phase modulated signal $F_{-\Delta}$ and $F_{+\Delta}$ are the deviations of the measured phase from the desired reference value. Instead of these it is possible to use other error magnitudes, however, e.g. the magnitudes $(F_{-\Delta})^2$ and $(F_{+\Delta})^2$.

It is also possible to obtain timing regulation according to the maximum of the envelope of the data signal as early-late regulation, in which case the envelope E is given by the relation $$E = \sqrt{g_{I,B}^2 + g_{Q,B}^2}. \quad (15)$$

In this case in order to sample the maximum of the envelope shifting is always in the direction of the larger value of the envelope:

$$\Phi_{new} = \Phi + \delta \text{sgn}(E_{+\Delta} - E_{-\Delta}). \quad (16)$$

Regulation according to the envelope has basically two weak points, however. On the one hand the difference between minimum and maximum of the envelope becomes smaller, the smaller the selected roll-off factor becomes for signal shaping, i.e. the better the utilization of the passband is. In consequence the regulating information becomes smaller and smaller with increasing utilization of the passband, although an especially good timing regulation is required precisely at high passband utilization. This problem does not limit the use of such regulation at sufficiently low passband utilization.

Figure 26:
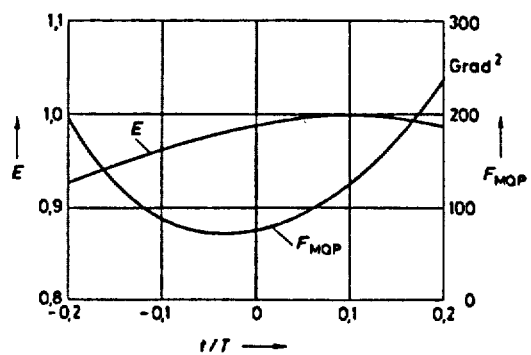

In this case there is also found disturbing a second property of the envelope. It appears that in the case of linear distortions the maximum of the envelope can occur consistently at a completely different timing instant than, for example, the minimum of the mean square error of the data signal which commonly agrees well with the optimum sampling instant. FIG. 26 (FIG. 2 of the original article) makes that clear by reference to the mean square phase error $F_{MQP}$ and the envelope E which are shown for a raised-cosine pulse shape with a roll-off of 0.5. The step speed was assumed to be 1600 Baud at a carrier frequency of 1800 Hz and merely the damping and group velocity fluctuation arising through two carrier frequency sections of a telephone channel were taken account of as the source of linear distortions. Already in this case the shift of the maximum of the envelope with respect to the mean square phase error amounted to about 13% of the timing period, which quite noticeably impairs the transmission quality.

The disadvantages just mentioned of envelope regulation of course remain if instead of the illustrated early-late regulation the timing phase is recovered by means of a phase locked loop as is frequently recommended [9].

As the last regulation criterion for timing regulation there is yet to be investigated the possibility so to regulate the sampling instant that in the times nT until nT+T/2 and nT+T−2 until (n+1)T on the average equally frequent transitions of the signal through the decision thresholds are found, a kind of regulation that often makes possible simple implementation. As a practical matter this corresponds to regulation of the sampling instant in such a way that the data signal in the middle between two sample values comes as close as possible to the average of the reference values determined for these sampling instants. The shift equation obtained therefrom is $$\Phi_{new} = \Phi + \delta \mathrm{sgn}(|\phi_k - \phi_{k+0,5}| - |\phi_{k-1} - \phi_{k+0,5}|), \quad (17)$$

wherein $\phi_{k+0,5}$ designates the value of the signal in the middle between the sampling instants kT and (k+1)T and $\phi_k$ and $\phi_{k+1}$ are the reference values determined for these sampling instants.

4. Comparison of the regulation methods in terms of error probability.

In order to be able to evaluate the capability of the described regulation methods, a simulation of the regulations was carried out and the error probabilities resulting in the presence of white noise were calculated for the presence of white noise when the systems are in steady state. The calculations were carried out in part with the assumption of a vanishingly small frequency error (FF) for carrier and timing frequency and in part for a carrier frequency error of 8 Hz and a simultaneous relative timing frequency error of $2.10^{-4}$. Transmission by four-step phase modulation at a carrier frequency of 1800 Hz was simulated as an example.

Figure 27:
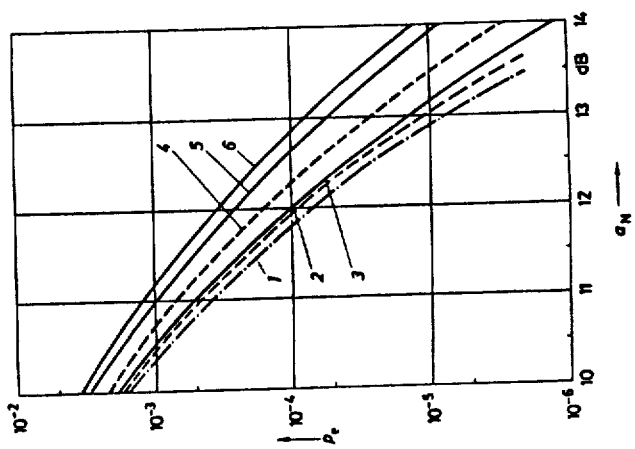

FIG. 27 (FIG. 3 of the original article) shows the behavior of the regulation methods in the case of transmission over a distortion-free transmission path with a step rate of 1600 Baud and a raised-cosine pulse shape [6] with a roll-off factor of 0.5. Curve 1 labeled "ideal" gives the obtainable error probability $p_e$ in dependence of the signal to noise $a_N$ in the case of carrier and timing phase stiffly adjusted at optimum. In the case of regulation (curve 2, with regulation, without FF) network spacing should be margined. The disturbance margin was only slightly diminished (i.e., $a_N$ must be magnified if $p_e$ is to remain equal), and this in fact for practically all combinations of the regulation criteria described in sections 3 and 4 down to a few exceptions still to be considered. Even under the effect of the assumed frequency error (curve 3, with regulation, with FF) the disturbance margin is further reduced although only slightly. Reduction of the disturbance margin worth mentioning is found only when the timing regulation is carried out according to the criterion given in (17), as shown in the three curves which are to the right in FIG. 27 (FIG. 3 of original article) (curves 4–6). The equation numbers specified in the figure legends set forth the regulation criteria used in the simulation. Here also the loss of disturbance margin is nevertheless tolerable throughout with maximally 1 dB at $p_e = 10^{-4}$. An analysis of this result from the simulation shows that the adjustments of carrier and timing phase are loosely coupled so that a stable setting of both regulations results somewhat to one side of the optimum adjustment.

Figure 28:
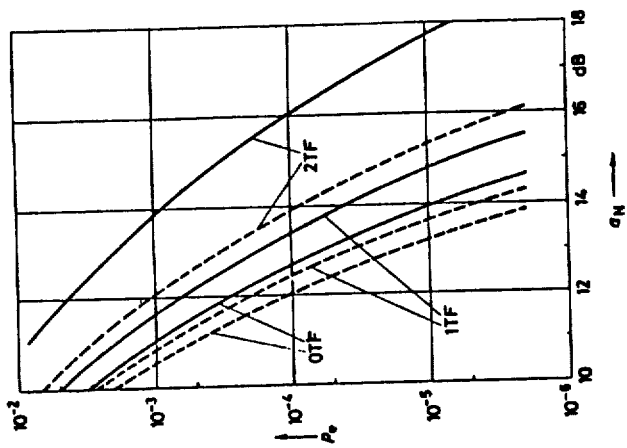

The behavior of this regulation in the case of distortions by one or two TF sections of a telephone channel is shown in FIG. 28 (FIG. 4 of original article), where the curves designated by OTF again show the behavior without distortions. The plainly smaller disturbance margin in the presence of frequency errors (with FF) here also indicates imperfections of the regulation which nevertheless remains usable throughout even in the case of distortions. In the case of transmission over two TF sections the disturbing influence of linear distortions is already preponderant.

Figure 29:
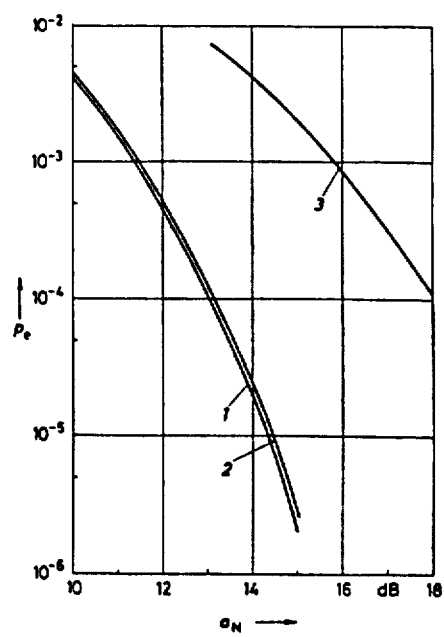

FIG. 29 (FIG. 5 of original article) provides an overview of the behavior of the regulation in transmission of 2400 bits/s over two TF sections, a roll-off factor of 0.9 being assumed for the pulse shaping. The two left-hand curves (1, 2) hold for timing regulation to the first null transition following the main value of the pulse, i.e. corresponding to the regulation criterion given in (12). Whether the carrier regulation is carried out according to (7) or according to (10a) has only little influence on the disturbance margin which is reduced merely by about 1.2 dB compared to a distortion-free transmission, at an error probability of $10^{-4}$ resulting essentially from linear distortion. The disturbance margin is drastically impaired, however, if the timing regulation is carried out with reference to the envelope in accordance with (16), as shown in curve 3. That emphasizes the problems already further explored above in the case of such regulation in the presence of distortions.

5. Concluding remarks.

The present results show that it is consistently possible to recover the carrier and timing phase at the beginning of a phase modulated data signal directly from the data signal. By means of a simulation it is possible to take account of the effect of practically desirable simplification, as, for example, the evaluation of merely the sign of the regulation magnitude and to dimension the regulation. In the selection of the regulation method it is particularly important to be cautious at places such as the example of the timing recovery from the envelope, with reference to linear distortions which can barely be taken account of without simulation.

The expansion of the results here obtained to transmission methods which utilize combined amplitude and phase modulation and are of particular interest because of their high bandwidth utilization, is evidently possible. The regulation criteria here provided can be taken over practically unchanged insofar as there is used only a pulse shape similar to the raised-cosine shape.

TEXT FOR KAMMEYER AND SCHENK 1980 ARTICLE IN AEÜ

Theoretical and experimental investigation of carrier phase regulation in digital modem

[Abstract is translated in origial]

1. Introduction

Figure 30A:
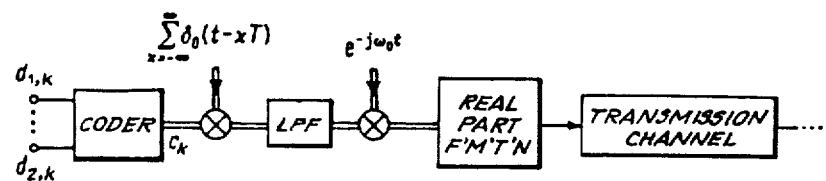
Figure 30B:
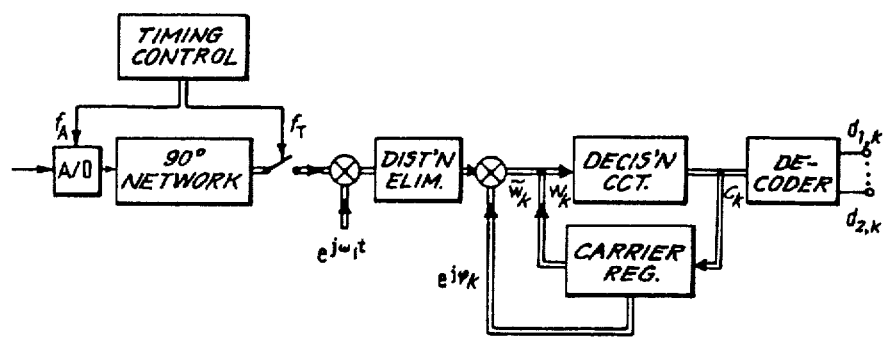

The structure of a data transmission system with any desired kind of linear modulation is shown in FIG. 30a and FIG. 30b. The binary data $d_{1,k}, \ldots, d_{L,k}$ are respectively assigned, by means of a coder, a complex number $c_k = a_k + jb_k$ in an unambiguous reversible manner. The manner of the assignment (coding) fixes the kind of modulation. The transmitting low-pass filter in general has real values in double sideband systems. It is excited with a sequence of equidistant complex pulses, where the pulse strengths represent the number $c_k$. The shift of the signal spectrum necessary for transmission over available channels is obtained by multiplication by $e^{-j\omega_0 1}$. The transmitted signal is finally obtained by forming the real part of it.

In the transmission channel there occurs, along with a linear distortion of the transmitted signal, some frequency discontinuity, i.e. shifting of the transmitted spectrum. The usually present synchronism between carrier and timing frequency gets lost thereby.

In the receiver, the received signal must be synchronously demodulated and freed of distortion. In the case of a purely digital implementation of the receiver, the arriving signal is first sampled with the sampling frequency of the receiver, which must be an integral multiple of the timing frequency, and converted into a digital signal. The timing frequency must be recovered from a special timing derivation circuit. The problems here arising are not the subject of this work. They are explained elsewhere [1]. Synchronous demodulation is carried out with the help of a digital 90° network and a following multiplication by $e^{j\omega_0 kT}$ without regard to frequency discontinuity in the transmission channel [2]. Adaptive distortion elimination then follows in order to compensate for the linear distortions of the channel. The phase error still present at the output of the distortion eliminator is regulated out by multiplication by $e^{j\omega_k}$. The advantage of this after-the-fact phase correction, i.e. taking effect on the output side of the distortion eliminator, lies in the minimal delay time for the carrier phase regulation, as a result of which rapid phase disturbances can be more favorably avoided.

On account of incomplete distortion elimination, carrier phase regeneration and timing recovery, as well as noise effects and inaccuracies of implementation, the received signals $\omega_k$ are not quite the same as the transmitted values $c_k$. These values can easily be recovered by a decision circuit, however, and the above-named disturbing influences thereby fully eliminated, so long as the deviations from the ideal states are not too great. In this work we shall always take this last assumption as a working basis, i.e. the actually transmitted values $c_k$ are assumed to be known in the receiver. The information necessary for carrier phase regulation can therefore be derived by comparison of the received signal points with the values transmitted. Such regulation methods are designated as coupled back from decision [3]. In the present work, algorithms for carrier phase regulation are more closely investigated. In section 3, simple linear model systems are developed which make possible analytic treatment. In section 4, these models will then be examined with reference to measurements on an actual experimental system.

2. Model system for carrier phase regulation.

The signal present at the output of the distortion eliminator contains, in addition to the above-mentioned disturbances, also a phase error $\psi_k$ caused by frequency discontinuity and phase jitter in the transmission path. The time discrete signal $\bar{\omega}_k = \bar{u}_k + j\bar{b}_k$ at the output of the distortion eliminator can then come from the ideal values $c_k$ lead to representation of the deviations $t_k = t_{uk} + jt_{vk}$ as well as the phase error $\psi_k$ (FIG. 31; FIG. 2 of original article). Multiplication by $e^{j\psi_k}$ should reduce the influence of the phase error $\psi_k$ as far as possible.

By comparison of the values $\omega_k = u_k + jv_k$ with the transmitted values $c_k = a_k + jb_k$ makes possible the derivation of a regulating value $\Phi_k$ which is related to the residual phase error $\Delta\phi_k = \psi_k + \phi_k$. The desired phase $\phi_k$ is obtained finally at the output of a linear integrating system with the transmission function G(z) with excitation by $\Phi_k$.

3. Analytic description of the carrier phase regulating loop.

For carrier phase regulation, a regulating magnitude $\Phi_k$ must first be derived from the values $\omega_k$ respectively preceding and following the decision circuit, which regulating magnitude contains the residual phase error $\Delta\phi_k = \psi_k + \phi_k$. For that purpose, with the understanding that $c^*_k$ is the conjugate complex value of $c_k$, we consider the magnitude $$Im(\omega_k c^*_k) = v_k a_k - u_k b_k. \qquad (1)$$

with $$\omega_k = (c_k + t_k)e^{j\Delta\phi_k} \qquad (2)$$

we have the result $$Im(\omega_k c^*) = |c_k|^2 \sin \Delta\phi_k + Im(t_k e^{j\Delta\psi} c^*), \qquad (3)$$

For carrier phase regulation there are examined in what follows two different regulating magnitudes:

$$\Phi_k^{(1)} = \frac{Im(w_k c_k^*)}{|c_k|^2} = \frac{v_k a_k - u_k b_k}{a_k^2 + b_k^2}, \qquad (4a)$$

$$\Phi_k^{(1)} \approx \Delta\phi_k + n_k^{(1)} \qquad (4b)$$

and by disregarding division by $|c_k|^2$ $$\Phi_k^{(2)} = Im(\omega_k c^*_k) = v_k a_k - u_k b_k. \qquad (5a)$$

$$\Phi_k^{(2)} \approx |c_k|^2 \Delta\phi_k + n_k^{(2)}. \qquad (5b)$$

In the above a small resulting phase error is assumed $(\sin \Delta\phi_k \approx \Delta\phi_k)$.

The phase noise affecting the regulation loop is represented here by $$n_k^{(1)} = \frac{Im(\tau_k e^{j\tau^*} c_k^*)}{|c_k|^2}, \qquad (6a)$$

$$n_k^{(2)} = Im(\tau_k e^{j\Delta\phi_k} c_k^*). \qquad (6b)$$

The disturbances $t_{uk} + jt_{vk}$ are assumed to be free of averaging and statistically independent of the transmitted characters $a_k + jb_k$ as well as symmetrical relations in the individual branches, i.e.

$$<a_k^2> = <b_k^2> = \sigma_a^2 = \sigma_b^2, \qquad (7a)$$

$$<r_{uk}^2> = <r_{vk}^2> = \sigma_k^2. \qquad (7b)$$

There results, for the effective phase noise, a power of $$\sigma_k^{(1)2} = <(n_k^{(1)})^2> = 2\sigma_k^2 < \left(\frac{a_k}{a_k^2 + b_k^2}\right)^2 >, \qquad (8a)$$

$$\sigma_k^{(2)2} = <(n_k^{(2)})^2> = 2\sigma_k^2 \sigma_k^2. \qquad (8b)$$

Regarding (7a) and (7b), $$<x_k> = \lim_{K\to\infty} \frac{1}{2K+1} \sum_{k=-K}^{K} x_k$$

for the time average of the magnitude $x_k$.

The regulation loop is now analyzed with the regulating magnitude $\Phi_k^{(1)}$. With the results here obtained, a simplified linear substitute system is developed for the regulating loop with the regulating magnitude $\Phi_k^{(2)}$.

Figure 31:
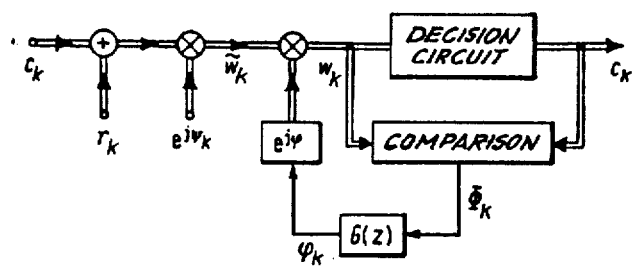
Figure 32:
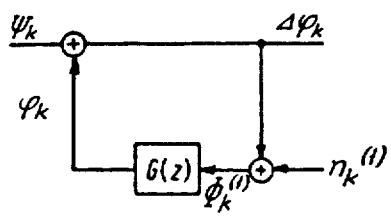

From equation (4) and FIG. 31 it follow directly that the linearized block circuit diagram for the regulation loop with the resulting magnitude $\Phi_k^{(1)}$ is as shown in FIG. 32.

The phase error $\psi_k$ which is produced in the transmission path expresses itself in a frequency shift and a phase jitter. The phase jitter is as a rule caused by the supply voltage, consequently the a.c. power frequency for integral multiples thereof can be assumed to be the jitter frequency. In the simplifying assumption of a single jitter frequency, one sets for the phase error $\psi_k$ $$\psi_k = \hat{\psi}_0 k + \hat{\psi}_1 \sin(\Omega_1 k), \qquad (9)$$

wherein $$\psi_0 = 2\pi f_\Delta / f_T \qquad (10)$$

The frequency discontinuity $\psi_1$ represents the jitter swing and $$\Omega_1 = 2\pi f_1 / f_T \qquad (11)$$

the jitter frequency of the transmission channel. The frequency shift is designated $f_\Delta$, the jitter frequency by $f_1$ and the timing frequency $f_T$.

The residual phase error is caused by the frequency discontinuity and the phase jitter of the channel as well as by phase noise. Because of the linearity of the model system, these three effects can be individually considered for an analytic treatment. For this purpose, there are given next the two transmission functions of the closed regulation loop according to FIG. 32.

$$F_1(z) = \frac{1}{1 - G(z)}, \quad F_2(z) = \frac{G(z)}{1 - G(z)}, \qquad (12a,b)$$

$F_1(z)$ here describes the interrelationship between $\Delta\phi_k$ and $\psi_k$ and $F_2(z)$ the interrelationship between $\Delta\phi_k$ and $n_k^{(1)}$.

The static phase error which is caused by the frequency distortion of the channel is obtained with the help of the limit value law of z transformation [3] and equation (9).

$$<\Delta\phi_k> = \phi_0 \lim_{z\to 1+0} \left[\frac{1}{z-1} F_1(z)\right]. \qquad (13)$$

The square phase error produced by phase jitter can be described by $$j<(\Delta\phi_k^{(1)})^2> = \frac{\phi_1^2}{2} |F_1(e^{j\alpha_1})|^2. \qquad (14)$$

Under the most permissible assumption of white, uncorrelated phase noise, the variance of the phase error caused by phase noise can be given $$<(\Delta\phi_k^{(n)})^2> = (\sigma_n^{(1)})^2 R_8 \qquad (15)$$

$R_2$ there designates the noise number or the noise transmission function of $F_2(z)$. It is defined by $$R_2 = \frac{1}{\pi} \int_\pi^\pi |F_2(e^{j\Omega})|^2 d\Omega. \qquad (16)$$

For the numerical calculation of the noise number there can be used the equivalent relation $$R_2 = \frac{1}{2\pi j} \oint_P F_2(z) F_2\left(\frac{1}{z}\right) \frac{1}{z} dz, \qquad (17)$$

where the integration must be carried around the unit circle and can be carried out by calculation of residues [4].

For the further description of the regulation loop, there is set for $G(z)$ the rational transmission function $$G(z) = P(z)/Q(z) \qquad (18)$$

with at first polynomials $P(z)$ and $Q(z)$ that are still unlimited in choice. It represents the relation between the regulation magnitude $\Phi_k$ and the phase $\phi_k$ which is to be calculated. For reasons of realization it must be required that $$\text{Grad}(P(z)) < \text{Grad}(Q(z)), \qquad (19)$$

since as a result of the decision process and the calculation of $\Phi_k$ with a delay of at least one step period must be taken into account.

For the two transmission functions of the closed regulation loop, there is obtained the following from equations (12) and (18).

$$F_1(z) = \frac{Q(z)}{Q(z) - P(z)}, \quad F_2(z) = \frac{P(z)}{Q(z) - P(z)}. \qquad (20a,b)$$

There is now the task to obtain a behavior of the closed regulation loop that is as optimal as possible by a suitable choice of the two polynomials $P(z)$ and $Q(z)$, e.g. to obtain a resulting phase error $<\Delta\phi \epsilon^n>$, that is as small as possible.

In the development it is first necessary to assure the stability of the regulation loop. Hence the position of the nulls of the denominator polynomial $$N(z) = Q(z) - P(z) \qquad (21)$$

must lie within the unit circle.

In order to obtain only a finite static phase error in the case of a frequency discontinuity (distortion) of the channel, there must be further required that there is at least one simple null for $z=1$ for the polynomial $Q(z)$, as can easily be ascertained by comparison of equations (13) and (20). This means that for the linear system with the transmission function $G(z)$ an integrating system must be selected.

The above-mentioned three conditions,
1. $\text{Grad}(P(z)) < \text{Grad}(Q(z))$.
2. Nulls of $N(z) = Q(z) - P(z)$ within the unit circle,
3. at least 1 null in $Q(z)$ for $z=1$, must first all be fullfilled. All further coefficients of $G(z)$ represent free parameters for optimizing the phase regulation loop. It may be mentioned that in [5] the regulation loop is optimized in accordance with the method here described, as a result of which a simple integrating system with the transmission function $$G(z) = \alpha_0/(z-1)$$

was derived and the variance of the residual phase error was selected as the optimization criterion.

Figure 33:
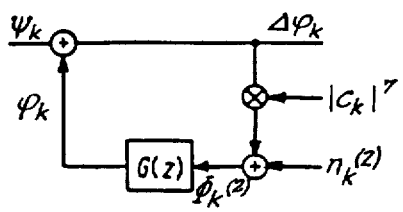

The regulation loop with the regulation magnitude $\Phi_k^{(2)}$ will now be examined further according to the equation (5). Because of neglecting the division by $|c_k|^2$ this regulation loop is substantially simpler to realize in a transmission system with combined phase and amplitude modulation (e.g. according to [6]). In FIG. 33 (FIG. 4 of the original article) the block circuit diagram for this regulating magnitude is illustrated. Here the multiplication of the resulting phase error $\Delta\phi_k$ by the stochastic magnitude $|c_k|^2$ dependent upon the data and also on the form of modulation has the effect of a supplemental disturbance.

For the analytic calculation of the resulting mean square phase error $<\Delta\phi_k^2>$ the magnitude $|c_k|^2$ is first decomposed into $$|c_k|^2 = c_0^2 + \Delta_k \tag{22}$$

Here there is $$c_0^2 = <|c_k|^2> = 2\sigma_a^2 \tag{23}$$

and correspondingly $$<\Delta_k> = 0. \tag{24}$$

Figure 34:
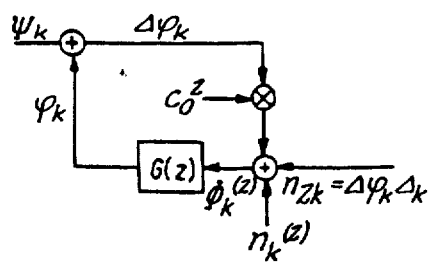

There is in this way obtained the block circuit diagram of the regulation loop shown in FIG. 34 (FIG. 5) of original article.

It will now be assumed for simplification that the supplementary noise signal $n_{zk} = \Delta\phi_k \Delta_k$ represents a white noise of the power $$<n_{zk}^2> = <\Delta\phi_k^2><\Delta_k^2> \tag{25}$$

uncorrelated with the phase noise $n_k^{(2)}$. With this approximation it is possible to split the resulting phase error $\Delta\phi_k$ into $$\Delta\phi_k = \Delta\phi_{k0} + \Delta\phi_{k1} \tag{26}$$

where $\Delta\phi_{k0}$ represents the reaction on $\psi_k$ and $n_k^{(2)}$ and likewise $\Delta\phi_{k1}$ the reaction on $n_{zk} = \Delta\phi_k \Delta_k$. For the resulting mean square phase error we then have $$<\Delta\phi_k^2> = <\Delta\phi_{k0}^2> + <\Delta\phi_{k1}^2>. \tag{27}$$

The calculation of $<\Delta\phi_{k0}^2>$ can be obtained in the same way as in the case of the regulation loop with the regulation magnitude $\phi_k^{(1)}$. For the two transmission functions of the closed regulation loop it must however be said that $$F_1(z) = \frac{1}{1 - c_0^2 G(z)}, \quad F_2(z) = \frac{1}{c_0^2} \frac{c_0^2 G(z)}{1 - c_0^2 G(z)} \tag{28a,b}$$

and the signal $n_k^{(2)}$ having the power $(\sigma_n^{(2)})^2$ must be taken account of in accordance with equation (8b).

For the second term of equation (27) we have $$<\Delta\phi_{k1}^2> = <\Delta\phi_k^2> R_2, \tag{29}$$

where $R_2$ represents the noise number of the transmission function $F_2(z)$ according to equation (28). From equation (27) we finally obtain $$<\Delta\phi_{ki}^2> = \frac{<\Delta_k^2><\Delta\phi_{k0}^2> R_2}{1 - <\Delta_k^2> R_2} \tag{30}$$

This result represents an approximation according to the simplifying assumptions, which approximation leads to a useful result only if the noise number of the transmission function $F_2(z)$ is not too large. Since in the case of a practical implementation it is desired to have a noise sensitivity that is as small as possible, i.e. a noise number $R_2$ which is small as possible, the calculation can be carried out by the relations above derived with sufficiently accurate approximation.

For judging the phase regulation loop the S/N ratio at the output of the phase regulation loop can be used. It calculates out to $$\left(\frac{S}{N}\right)_A = \frac{<|c_2|^2>}{<|\omega_2 - c_2|^2>} \tag{31}$$

with equations (2) and (7) and the assumption of disturbance free of averaging at the input of the carrier phase regulation loop, $$<r_{uk}> = <T_{vk}> = 0, \tag{32}$$

we get the result $$\left(\frac{S}{N}\right)_A = \frac{\sigma_a^2}{2\sigma_a^2 <1 - \cos\Delta\phi_k> + \sigma_r^2} \tag{33}$$

If now we set by way of approximation for $\cos\Delta\phi_k \approx 1 - \Delta\phi_k^2/2$ we finally obtain for the deterioration of the S/N ratio as a result of carrier regulation $$\frac{(S/N)_A}{(S/N)_E} = \frac{1}{1 + (S/N)_E <\Delta\phi_k^2>}. \tag{34}$$

In the above there is designated by $$(S/N)_E = \sigma_n^2/\sigma_r^2 \tag{35}$$

the S/N ratio at the input of the carrier phase regulation loop.

4. Comparison in terms of measurement technology.

In [2] a report was presented regarding a flexible experimental system for data transmission in the field of a telephony which permitted real time investigations of real channels. Since then the system there described was extended by the provision of a microprogrammable processor which takes over the tasks of deriving the carrier and timing frequency [7]. The apparatus is freely programmable so that carrier algorithms which are widely selectable can be implemented and compared with each other.

Figure 35:
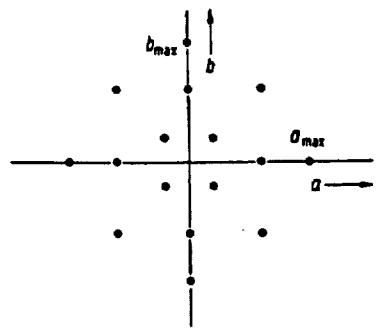

The measurements here reproduced were obtained with this experimental system. An adjustable artificial line [8] served as the transmission channel; propagation time and damping distortions were selected that corresponded approximately to three TF sections. The linear distortions of the received signal were compensated by a distortion eliminator with double sampling [9]. The transmission speed in all cases were 9.6 kbit/s, with the selected transmission type being the 16-step PSK/ASK scheme recommended by the CCITT [6] (compare FIG. 35 which is the signal space representation of the modulation method at 9.6 kbit/s of the modulation method recommended by CCITT); the step rate was accordingly 2.4 kBaud. The measurements were carried out by direct comparison of the disturbed phases fed to the receiver with the correcting phases calculated by the processor.

Figure 36:
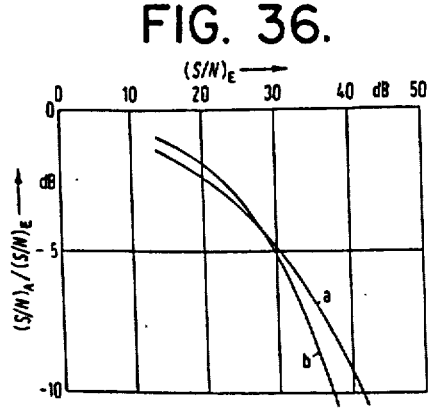
Figure 37:
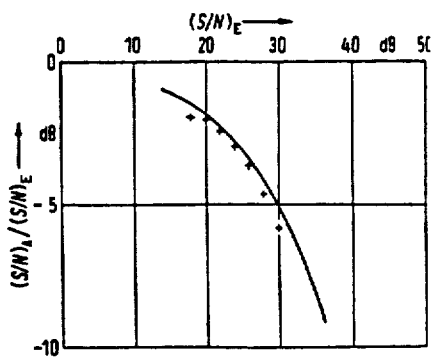

For the following investigations a regulation loop of first degree were first formed, i.e. for G(z) a simple integrating system of the form $G(z) = \alpha_0/(z-1)$ was established. FIG. 36 (FIG. 7 of the original article) shows a numerical evaluation of the theoretically derived relation between disturbing loss of spacing as a result of the carrier regulation and the S/N ratio at the input of the carrier phase regulation loop (equation (33)). Curve a is for the regulating magnitude $\Phi_k^{(1)}$ and curve b for the regulating magnitude $\Phi_k^{(2)}$. A frequency shift of 7 Hz and a phase jitter of 30° pp/50 Hz were set in in the case of each of the two regulation criteria. It is to be recognized that the use of the regulating magnitude $\Phi_k^{(2)}$, which indeed is more favorable than $\Phi_k^{(1)}$ with regard to implementation, leads to a better behavior under disturbance when the S/N ratio is less than 28 dB. That is usually satisfied in practice. The measurement technology experiments accordingly became limited to the regulation criterion $\Phi_k^{(2)}$. Next the behavior just described of the signal-disturbance margin was checked by measurement. FIG. 37 (FIG. 8 of the original article) shows the comparison once more of the curve calculated from the model and a few points obtained by measurement.

Figure 38:
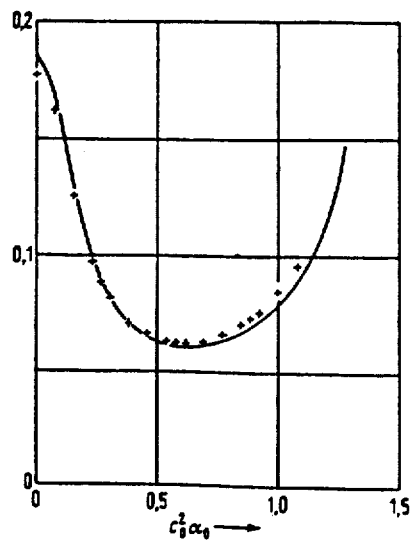

In what follows the phase error itself is considered. Its scatter $\sigma_{\Delta\phi}$ is reproduced in FIG. 38 as a function of the regulation loop parameter $\alpha_0$ in the case of assuming a phase jitter of 30° pp/50 Hz and a S/N ratio prior to phase regulation of 22 dB: For comparison a few measure points are also plotted. It is found that in the case of known disturbing effects an optimal constant $\alpha_0$ is evidently providable ($\alpha_{0\ opt} = -1.1/\alpha_{max}^2$ with $c^2/\alpha_{max}^2 = 0.54$).

The same holds for the free parameters of a regulation loop of 2nd order. For G(z) there is here set the transmission function $$G(z) = \frac{\alpha_1 z + \alpha_0}{(z-1)^2}.$$

The constant phase reduction resulting from frequency shift is in this case to be fully eliminated (compare equation (12) and 13)). The constants $\alpha_1$ and $\alpha_0$ are optimized in terms of least square phase error for a phase jitter of 30° pp/50 Hz and an S/N ratio of 22 dB. The following values result:

$\alpha_1 = -0{,}836/\alpha_{max}^2$,
$\alpha_0 = 0{,}596/a_{max}^2$.

The scatter of the resulting phase error thus to be obtained, in the case of the above described channel disturbances, is $\sigma_{\Delta\phi k} = 0.053$ according to theoretical model, the loss of spacing from disturbance amounts to $-1.6$ dB. The measurement produced the values $\sigma_{\Delta\phi k} = 0{,}053$,
$(S/N)_E/(S/N)_A = -1{,}85$ dB.

Figure 39:
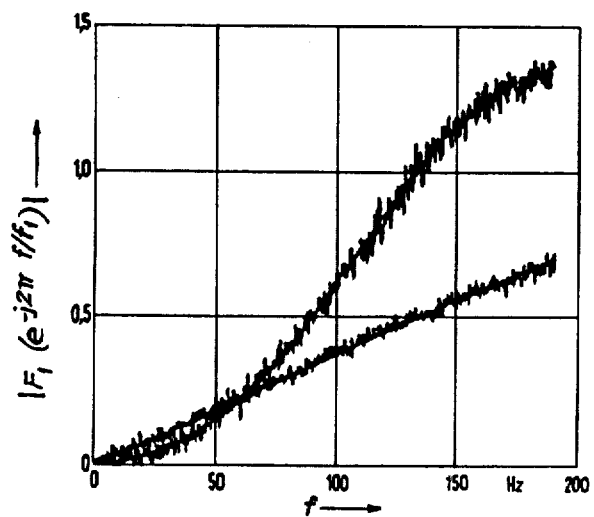

The course of disturbance frequency of the systems of first and second degree are reproduced, finally, in FIG. 39, i.e. the reaction of the carrier regulation to sinusoidal phase jitter. For comparison the calculated and measured curves are superimposed. Both regulation loops deteriorate with increasing jitter frequency; in the system of 2nd degree, the closed regulation loops leads even to a jitter amplification above about 135 Hz. It will be recognized, however, that in the case of the jitter frequency of 50 Hz, for which the two regulation loops were optimized ($f_1 = 50$ Hz, $\hat{\psi}_1 = 15°$, $f_A = 7$ Hz, S/N = 22 dB), the system of 2nd degree is slightly better.

5. Summary

In the present work the problems of carrier phase regulation in digital modems were investigated. For two different regulation magnitudes linear equivalent systems were provided which permitted optimal dimensioning of the regulation loop parameters. With the use of a concrete application example the two investigated regulation criteria were compared with each other. For the transmission the 16-step method with a data rate of 9.6 kbit/s recommended by the CCITT was selected [6]. In the comparison of the two regulation loops a somewhat more favorable behavior under disturbance was found for the second regulation criterion, if the S/N ratio of the received signal is less than 28 dB. Since the regulation magnitude here used, moreover, can be realized still substantially more simply, this regulation loop seems suitable for insertion in digital modems.

The theoretical results obtained on the basis of linearized equivalent systems, such as disturbance margin loss, average squared phase error and course of disturbed frequency, were checked by reference to measurements on an experimental system working in real time under realistic transmission conditions. Quite good agreement between model and measurement resulted.

[Acknowledgements and received date omitted and list of references deferred to the end of this specification]

1979 AEÜ ARTICLE BY HEINRICH SCHENK

On the design of non-recursive filters in digital modems

1. Introduction

Figure 40A:
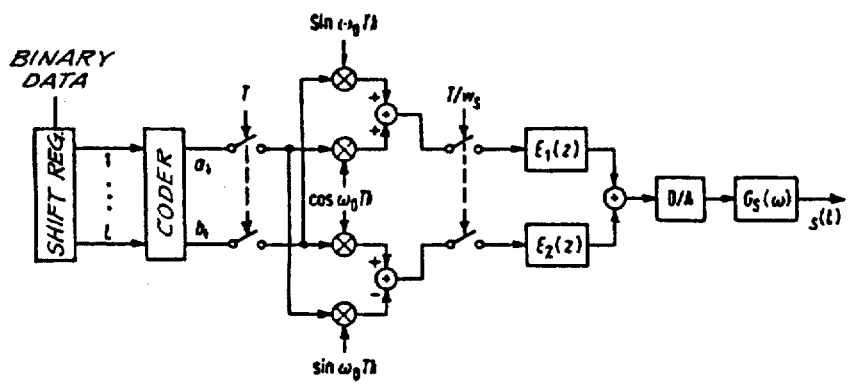
Figure 40B:
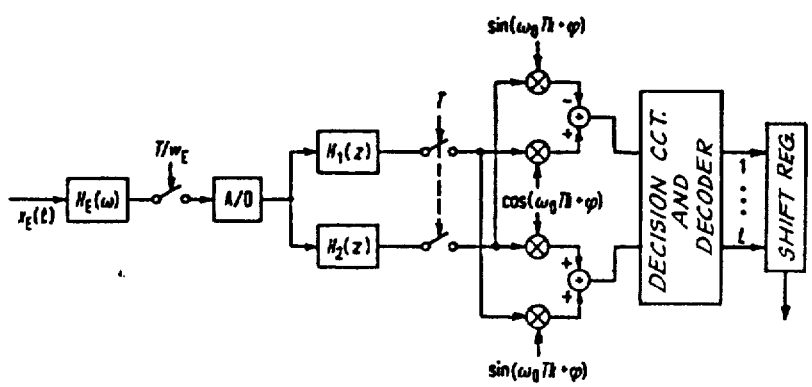

For rapid data transmission over telephone channels quadrature amplitude modulation has been found favorable on account of the small bandwidth that is available. For a given step rate an increase of the transmission rate by increasing the step content is possible. In so doing the precision requirements increase, so that a digital implementation is advantageous. A correspondingly favorable structure for transmitter and receiver is shown in [1]. The circuit block diagram of the transmission system is shown in FIGS. 40a and 40b (FIG. 1 of original article). The binary indput data are collected into groups of L bits and associated with a number pair ($a_k$, $b_k$) that can be understood as a point in the complex signal plane. The modulation that follows corresponds to a rotation of this complex value around the angle $\omega_0 kT$. The actual transmitted signal $x_s(t)$ finally results after filtering with a filter pair described by $E_1(z)$ and $E_2(z)$, D/A conversion and following smoothing with a continuous filter. The receiver is made in mirror image of the transmitter: After prefiltering there is sampling and A/D conversion at a rhythm in general higher by the integral number factor $w_E$ and a digital further processing in the systems designated $H_1(z)$ and $H_2(z)$. After the sampling at the step rate there follows the demodulation. At a suitably chosen phase position the originally transmitted values $a_k$ and $b_k$ are obtained in the case of ideal transmission.

In the present work information is given regarding a favorable design of non-recursive digital filters for the above mentioned structure. A related task was dealt with in [2]. There the object of the investigation was the design of optimal transmitted signals.

In the first section the requirements of the system are to be determined anew on account of the partly changed structure.

2. Conditions for ideal transmission 2.1 Conditions for transmission free of interference between symbols The conditions will first be given which must be fulfilled by the transmission system for transmission free of interference between symbols. We accordingly proceed from the simplified structure shown in FIG. 41, in which the transmission functions of transmitting and receiving filters with taking account of the necessary continous systems designated by $G_{1,2}(\omega)$ and $H_{1,2}(\omega)$ are shown.

The rotation of the points ($a_k$, $b_k$) in the signal plane can be expressed by the relation $$\begin{pmatrix} \bar{a}_k \\ \bar{b}_k \end{pmatrix} = \begin{pmatrix} \cos\omega_0 kT & \sin\omega_0 kT \\ -\sin\omega_0 kT & \cos\omega_0 kT \end{pmatrix} \begin{pmatrix} a_k \\ b_k \end{pmatrix} . \quad (1)$$

For the calculation of the two output functions $y_{1,2}(t)$ the partial pulse responses $$\bar{n}_{1,2}(t) = g_{1,2}(t) * c(t) * h_{1,2}(t), \quad (2a)$$

$$\bar{q}_{1,2}(t) = g_{1,2}(t) * c(t) * h_{2,1}(t) \quad (2b)$$

are introduced. Here $g_{1,2}(t)$ and $h_{1,2}(t)$ designate the pulse responses of the transmitting and receiving filters and $c(t)$ that of the channel. There is accordingly first obtained $$\begin{pmatrix} y_1(t) \\ y_2(t) \end{pmatrix} = \sum_{i=-\infty}^{+\infty} \begin{pmatrix} \bar{n}_1(t - iT) & \bar{q}_2(t - iT) \\ \bar{q}_1(t - iT) & \bar{n}_2(t - iT) \end{pmatrix} \begin{pmatrix} \bar{a}_i \\ \bar{b}_i \end{pmatrix} \quad (3)$$

and with equation (1) for the output functions in the point iT $$\begin{pmatrix} y_1(iT) \\ y_2(iT) \end{pmatrix} = \quad (4)$$

$$\begin{pmatrix} \cos\phi & -\sin\phi \\ \sin\phi & \cos\phi \end{pmatrix} \begin{pmatrix} \cos\omega_0 kT & -\sin\omega_0 kT \\ \sin\omega_0 kT & \cos\omega_0 kT \end{pmatrix} \cdot$$

$$\sum_{i=-\infty}^{+\infty} \left\{ \begin{pmatrix} \bar{n}_1[(k-i)T]\bar{q}_2[(k-i)T] \\ \bar{q}_1[(k-i)T]\bar{n}_2[(k-i)T] \end{pmatrix} \cdot \right.$$

$$\left. \begin{pmatrix} \cos\omega_0 iT & \sin\omega_0 iT \\ -\sin\omega_0 iT & \cos\omega_0 iT \end{pmatrix} \begin{pmatrix} a_i \\ b_i \end{pmatrix} \right\} .$$

These values must fulfill the condition $$\begin{pmatrix} y_1(kT) \\ y_2(kT) \end{pmatrix} = \begin{pmatrix} a_{k-x} \\ b_{k-x} \end{pmatrix} \quad (5)$$

for transmission free of intersymbol interference, where $\div T$ designates the constant delay time of the transmission system. From this directly follows a sufficient condition for the partial pulse responses $$\bar{n}_1(iT) = \bar{n}_2(iT) = \begin{cases} 1 \text{ for } i = x \\ 0 \text{ otherwise} \end{cases} \quad (6a)$$

$$\bar{q}_1(iT) = \bar{q}_2(iT) = 0 \; \forall i. \quad (6b)$$

For the constant phase of the demodulation oscillation there must also be selected $$\phi = -\omega_0 \div T \quad (7)$$

2.2. Conditions for suppression of undesired higher spectral components in the demodulated signal A data transmission system that fulfills only the condition (6) will in general have a great sensitivity with respect to fluctuations of the instant of sampling. This is shown especially by spectral components in $y_{1,2}(t)$ above the carrier frequency $\omega_0$. In order to avoid these the filters must satisfy supplementary conditions. For the spectra at the output we have from equation (4) with $$x(t) = \left[ \sum_{(i)} \bar{a}_i g_1(t - iT) + \sum_{(i)} \bar{b}_i g_2(t - iT) \right] * c(t), \quad (8)$$

$$\begin{pmatrix} Y_1(\omega) \\ Y_2(\omega) \end{pmatrix} = \frac{1}{2} \begin{pmatrix} \cos\phi & -\sin\phi \\ \sin\phi & \cos\phi \end{pmatrix} \cdot$$

$$\left\{ \begin{pmatrix} H_1(\omega - \omega_0) - \frac{1}{j} H_2(\omega - \omega_0) \\ \frac{1}{j} H_1(\omega - \omega_0) & H_2(\omega - \omega_0) \end{pmatrix} X(\omega - \omega_0) + \right.$$

$$\left( \begin{array}{c} H_1(\omega - \omega_0) \frac{1}{j} H_2(\omega - \omega_0) \\ -\frac{1}{j} H_1(\omega - \omega_0) H_2(\omega - \omega_0) \end{array} \right) X(\omega + \omega_0) \right\}.$$

The requirement $$Y_{1,2}(\omega) \equiv 0 \text{ für } |\omega| \geq \omega_0 \quad (9)$$

can be fulfilled with $$H_1(\omega) = \frac{1}{j} \text{sgn}\omega \cdot H_2(\omega) \quad (10)$$

if the spectrum of the received signal above the double carrier frequency vanishes $$X(\omega) \equiv 0 \text{ für } |\omega| \geq 2\omega_0. \quad (11)$$

Equation (10) states that $y_1(t)$ and $y_2(t)$ must be Hilbert transforms of each other.

3. Principal design possibilities.

The conditions (6) and (10) describe a basic possibility for design of the filters in the transmitter and receiver. Accordingly there are first selected the receiving filters corresponding to equation (10), e.g. a recursive 90° network can be used here [1]. The transmitting filters are then to be designed for approximative fulfillment of equation (6). In [2] the procedure essentially corresponded to this possibility, although the usual analog receiving structure was postulated for the receiver. The method particularly offers advantages in a digital implementation, since that can be implemented in the case of moderate distortions by the channel without additional effort. In many cases it is not usable, however, for reasons of compatibility. On that account the actual distortion elimination (fulfillment of the condition (6)) is carried out by suitable choice of the receiving filter in the receiver. The condition (10) must then be replaced by requirements on the transmitting filters taking account of equation (6).

We next consider the spectra of the partial pulse responses (2)

$$\overline{N}_{1,2}(\omega) = G_{1,2}(\omega) C(\omega) H_{1,2}(\omega), \quad (12a)$$

$$\overline{Q}_{1,2}(\omega) = G_{1,2}(\omega) C(\omega) H_{2,1}(\omega). \quad (12b)$$

If we now set $$\Delta_1(\omega) = \overline{N}_1(\omega) - \overline{N}_2(\omega),$$

$$\Delta_2(\omega) = \overline{Q}_1(\omega) + \overline{Q}_2(\omega),$$

we then obtain, by equation (10)

$$\Delta_1(\omega) = \left[ \frac{1}{j} \text{sgn}\omega G_1(\omega) - G_2(\omega) \right] C(\omega) H_2(\omega), \quad (13a)$$

$$\Delta_2(\omega) = \left[ G_1(\omega) + \frac{1}{j} \text{sgn}\omega G_2(\omega) \right] C(\omega) H_2(\omega) \quad (13b)$$

$$= j \text{sgn}\omega \cdot \Delta_1(\omega). \quad (13c)$$

If the requirements (6) are fulfilled, the following generally holds:

$$\sum_{\nu=-\infty}^{+\infty} \Delta_1(\omega - \nu \cdot 2\pi/T) \equiv 0, \quad (14a)$$

$$\sum_{\nu=-\infty}^{+\infty} \Delta_2(\omega - \nu \cdot 2\pi/T) \equiv 0. \quad (14b)$$

On account of equation (13c) there follows the prescription $\Delta_{1,2}(\omega) \equiv 0$. It is evidently to be fulfilled with $$G_2(\omega) = \frac{1}{j} \text{sgn}\omega G_1(\omega) \quad (15)$$

The conditions for the second basic possibility for design of transmitting and receiving filters are thereby formulated. Proceeding from a transmitting filter pair, the frequency characteristics of which fulfill equation (15), receiving filters for transmission free of intersymbol interference are developed according to the condition (6).

4. Design of transmitting and receiving filters.

4.1. Design of the transmitting filter pair.

In the design of the transmitting filter pair, in addition to taking account of the condition (15), it is necessary for reasons of compatibility to take account also of the fact that commonly a certain amplitude spectrum at the transmitter output and a pulse shape as symmetrical as possible are prescribed. One can meet these requirements with linear phase non-recursive digital filters. The 90° phase difference and the symmetrical pulse shape can in these cases be exactly obtained, while the required course of amplitude can be maintained only approximately.

The problem to be solved is, given a certain desired frequency characteristics with taking account of a suitable error criterion, to determine the filter coefficients. Design methods for non-recursive discrete systems with linear phase under requirements in the frequency region are known from the literature (see [3]). In our application case account must be taken in the design of the fact that the transmitted signal $\chi_S(t)$ is produced with smoothing of the step function present at the output of the D/A converter. For the two frequency characteristics $G_{1,2}(\omega)$ the following therefore holds $$G_{1,2}(\omega) = E_{1,2}(\omega) \cdot D(\omega). \quad (16)$$

The frequency characteristics of the digital filter to be designed here are $E_{1,2}(\omega)$ and $$D(\omega) = \frac{T}{w_s} \frac{\sin \omega T/w_s}{\omega T/w_s} G_s(\omega) \quad (17)$$

is the frequency characteristic of the D/A converter with connected continuous smoothing filter described by $G_s(\omega)$. The ratio of sampling frequency to step rate is designated by $$\omega_S = f_A/f_T \in N \quad (18)$$

We introduce now the desired frequency characteristics $G_{1,2}^w(\omega)$ of the transmitter which apart from the causality condition ought to be selected in accordance with equation (15), so that $G_1^w(\omega)$ is a real straight line and $G_2^w(\omega)$ is an imaginary non-linear function. The error frequency characteristic can then be described as $$\epsilon_{1,2}(\omega) = E_{1,2}(\omega)D(\omega) - G^W_{1,2}(\omega) \tag{19a}$$

$$= D(\omega)\left[E_{1,2}(\omega) - \frac{G^W_{1,2}(\omega)}{D(\omega)}\right]. \tag{19b}$$

Given a certain error criterion, the error can then be minimized with known numerical methods by the selection of $E_{1,2}(\omega)$.

4.2 Design of the receiving filter pair.

4.2.1. Design of the receiving filter pair with knowledge of the channel properties.

After design of the transmitting filter pair there must now, given the certain channel described by $C(\omega)$ or $c(t)$, be designed a receiving filter pair in such a way that the conditions (6) for transmission free of intersymbol intereference are at least approximately fulfilled. As in the case of the transmitting filters, non-recursive time discrete systems are postulated for the design here. The requirement of linear phasing must here be neglected, however, since the channel naturally cannot be assumed to have only linear phase distortion. For representation of the design method we consider next the sample values of the partial pulse responses $n_{1,2}(t)$ and $q_{1,2}(t)$. If we designate the coefficients of the non-recursive receiving filter of the degree $M-1$ by $h_{1,2}(\mu)$ and introduce the abbreviations $$r_{1,2}(t) = g_{1,2}(t) * c(t) \tag{20}$$

then $$\bar{n}_{1,2}(kT) = \sum_{\mu=1}^{M} h_{1,2}(\mu) r_{1,2}\left[\left(k - \frac{\mu-1}{\omega_E}\right)T\right], \tag{21a}$$

$$\bar{q}_{1,2}(kT) = \sum_{\mu=1}^{M} h_{2,1}(\mu) r_{1,2}\left[\left(k - \frac{\mu-1}{\omega_E}\right)T\right]. \tag{21b}$$

Now sample values of the partial responses are collected together in groups of N samples, at a spacing T $$\bar{n}_{1,2} = (\bar{n}_{1,2}(T), \bar{n}_{1,2}(2T), \ldots, \bar{n}_{1,2}(NT))^T, \tag{22a}$$

$$\bar{q}_{1,2} = (\bar{q}_{1,2}(T), \bar{q}_{1,2}(2T), \ldots, \bar{q}_{1,2}(NT))^T. \tag{22b}$$

It then follows by equation (21) and $$h_{1,2} = (h_{1,2}(1), h_{1,2}(2), \ldots, h_{1,2}(M))^T \tag{23}$$

$$\bar{n}_{1,2} = R_{1,2} h_{1,2}, \quad \bar{q}_{1,2} = R_{1,2} h_{2,1}. \tag{24a, b}$$

In the above $R_{1,2} N \times M$ are $N \cdot M$ rectangular matrices with the elements $$r_{1,2ij} = r_{1,2}\left[\left(i - \frac{j-1}{\omega_E}\right)T\right], \tag{25}$$

$$j = 1, \ldots, M, \quad i = 1, \ldots, N.$$

If now the deviations of an inexact maintenance of the condition (6) are designated by the vectors $\delta_{11}$, $\delta_{21}$, $\delta_{12}$ and $\delta_{22}$, the following relations are obtained for the calculation of the filter coefficients:

$$R_1 h_1 = e_x + \delta_{11}, \quad R_2 h_1 = \delta_{21}, \tag{26a, b}$$

$$R_1 h_2 = \delta_{12}, \quad R_2 H_2 = e_x + \delta_{22}. \tag{26c, d}$$

The unity vector $e_x$ with the components $$e_x(i) = \begin{cases} 1 & \text{for } i = x \\ 0 & \text{otherwise} \end{cases} \tag{27}$$

here describes the ideal pulse response of the system. A goal function is now introduced that contains both the squared deviations from the ideal pulse response and also the noise transmission function of the two filters:

$$F = \delta_{11}^T \delta_{11} + \delta_{12}^T \delta_{12} + \delta_{21}^T \delta_{21} + \delta_{22}^T \delta_{22} + g(h_1^T h_1 + h_2^T h_2) \tag{28a}$$

The magnitude g here represents a suitable weighting factor to be selected. The goal function can be represented in the form $$F = h_1^T(gE + R_1^T R_1 + R_2^T R_2)h_1 + \tag{28b}$$
$$h_2^T(gE + R_1^T R_1 + R_2^T R_2)h_2 - 2h_1^T R_1^T e_x - 2h_2^T R_2^T e_x + 2.$$

The minimization of this function leads to the relations for the calculation of the filter coefficients $$h_{1,2} = (gE + R_1^T R_1 + R_2^T R_2)^{-1} R_{1,2}^T e_x. \tag{29}$$

4.2.2. Calculation of the filter coefficients in the case of unknown channel properties.

If the channel properties at the receiver are not known, the distortion elimination for the transmission channel must be done adaptively. In the case of the usual elimination of distortion in the baseband, i.e. after demodulation, there is required, along with the receiving filter pair, a four-channel distortion elimination structure [1], [4].

Figure 41:
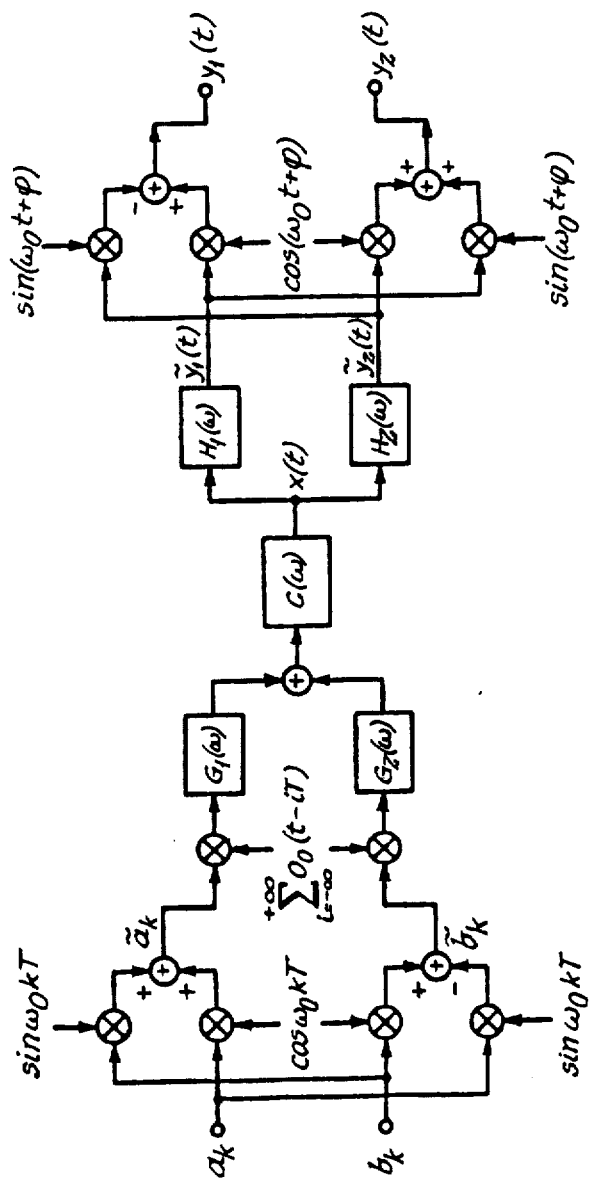

The two-channel receiver structure shown in FIG. 41 (FIG. 2 of original article), along with the receiver filtering, is also suited for adaptive elimination of distortion of the transmission channel. Here the coefficients $h_{1,2}(\mu)$ are to be iteratively set or provided by regulation controlled by the output. The sampling frequency at the input must, however, be chosen for maintaining the requirement of the sampling theorem as an integral multiple (multiplying factor $w_E$) of the timing frequency. The operating speed is determined however, exclusively from the step rate $1/T$ on account of the non-recursive receiver structure.

For calculating the filter coefficients, the equation system (29) must be solved iteratively. For using the gradient algorithm, knowledge of the error at the output of the filter pair is necessary. The deviations from the ideal values can be represented with the relation $$\begin{pmatrix} \Delta \bar{o}_k \\ \Delta \bar{b}_k \end{pmatrix} = \begin{pmatrix} \bar{y}_1(kT) \\ \bar{y}_2(kT) \end{pmatrix} -$$

$$\begin{pmatrix} \cos(\omega_0 kT + \phi) & \sin(\omega_0 kT + \phi) \\ -\sin(\omega_0 kT + \phi) & \cos(\omega_0 kT + \phi) \end{pmatrix} \begin{pmatrix} \bar{a}_k \\ \bar{b}_k \end{pmatrix}$$

wherein the values $(\bar{a}_k, \bar{b}_k)$ are obtained with the assistance of a decision circuit following the demodulation. In the case of error-free transmission they correspond exactly to the transmitted symbols ($a_k$, $b_k$). As a setting prescription for the filter coefficients we have [4]

$$h_1^{j+1}(\mu) = (1 - g\gamma)h_1^j(\mu) - \gamma\overline{\Delta\bar{a}_k x_S[(k - x - \mu/\omega_E)T]}, \quad (30a)$$

$$h_2^{j+1}(\mu) = (1 - g\gamma)h_2^j(\mu) - \gamma\overline{\Delta\bar{b}_k x_S[(k - x - \mu/\omega_E)T]}, \quad (30b)$$

$$\mu = 1, \ldots, M.$$

Figure 42:
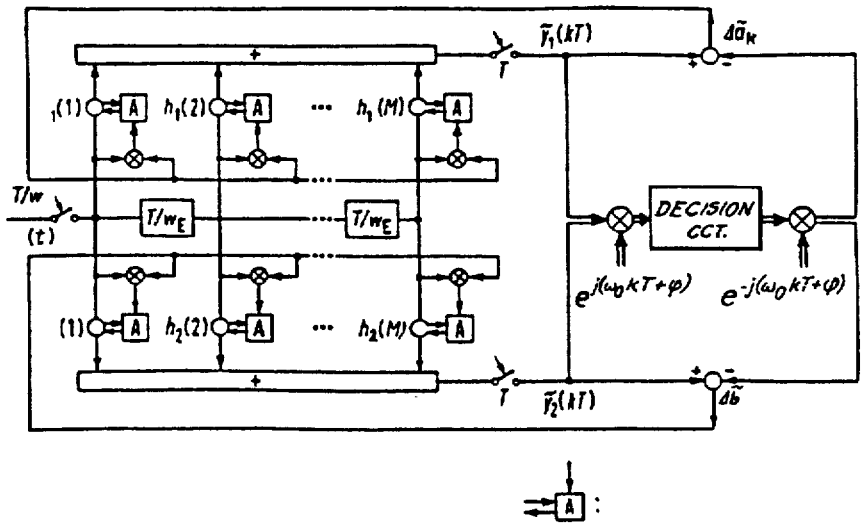

Here j designates the [ordinal] number of the iteration step. The setting magnitude $\gamma$ affects the initial adjustment speed. It must not exceed a maximum value for reasons of stability. The noise transmission function of the filter pair can be affected by the value g, as described in section 4.2.1. FIG. 42 shows the circuit block diagram for the adaptive filter pair as well as the circuit for reporting the error.

5. Examples

The accomplishment capability of the described design method will now be shown by reference to concrete examples.

In the first application case the step rate is selected as 1.2 kBaud. This corresponds to CCITT recommendation V25 [5]. $f_0 = 1.8$ kHz is provided for the carrier frequency.

Figure 43:
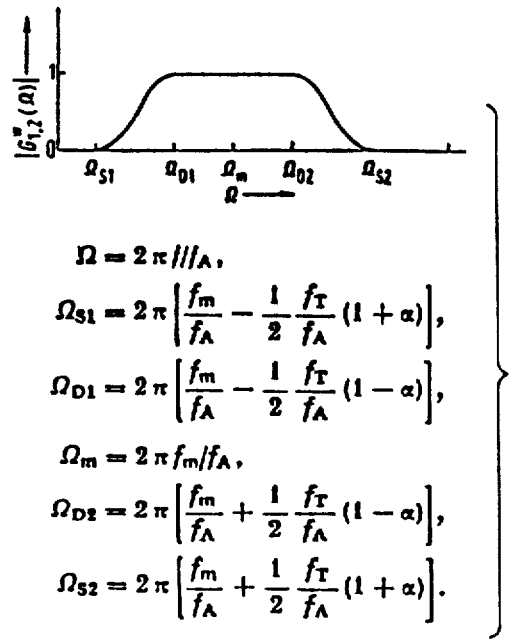

For the design of the non-recursive transmitting filter pair the sampling frequency of the filter and the amplitude frequency characteristic of the analog smoothing lowpass filter are to be predetermined. For the sampling frequency $f_A = 9.6$ kHz is chosen and a Butterworth lowpass filter of the sixth degree with a 3 dB limit frequency of 3.2 kHz is selected as the smoothing filter. As the desired course for the spectrum at the output, the function outlined in FIG. 43 with cosine shape transitions at the band limits is used. The magnitude $\alpha < 1$ which is still freely selectable is designated as roll-off factor and is a measure for the steepness of the desired spectrum in the transition region. We use here $\alpha = \frac{2}{3}$. The carrier frequency $f_0$ is taken as the midfrequency $f_m$. It should be mentioned here however that in general $f_m$ does not need to coincide with $f_0$.

Figure 44A:
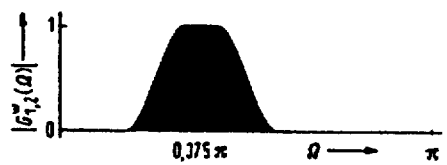
Figure 44B:
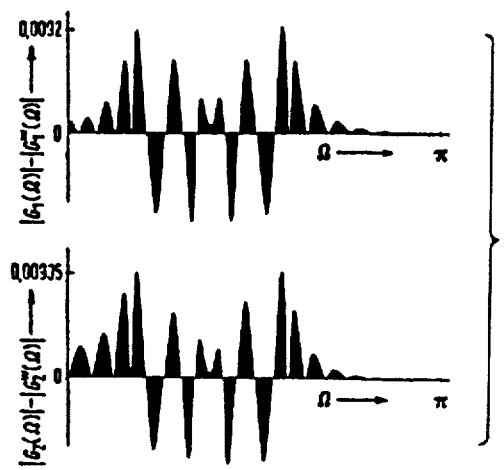
Figure 45:
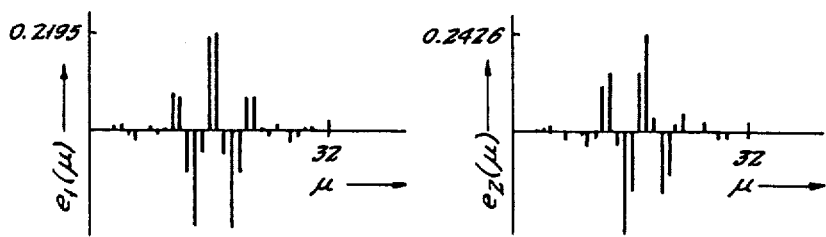

By means of a Fourier approximation the desired frequency course for the digital transmitting filter $G_{1,2}^w(\omega)/D(\omega)$ the filter coefficients can be calculated. FIG. 44a (FIG. 5 of original article) shows the desired characteristic $|G_{1,2}^w(\omega)|$ and FIG. 44b shows the deviations $|G_{1,2}(\omega)| - |G_{1,2}^w(\omega)|$ which result for a filter length of M=32. In FIG. 45 (FIG. 6 of the original article) are shown the pulse responses $e_{1,2}(\nu)$ of the two filters. The numerical calculation was carried out in this case with the help of the FFT.

Figure 46:
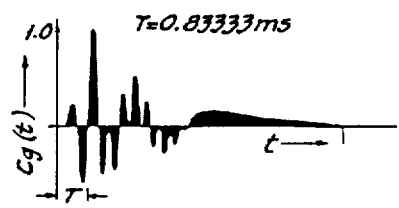
Figure 47:
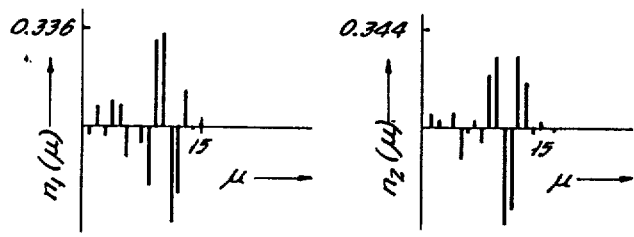

For the design of the two non-recursive receiving filters a real artificial line was postulated as the transmission channel [6]. Two TF sections as well as a 50 km long weekly pupinized line were hereby stimulated. A Butterworth lowpass filter of the sixth degree with a 3 dB limit frequency of 3.2 kHz was selected for the analog receiving filter as in the case of the transmitter. The sampled real pulse response of the channel including the analog filters in transmitter and receiver $c_g(t)$ is shown in FIG. 46. (FIG. 7 of original article). For a sample frequency of 7.2 kHz and a filter length M=16 the result is the pulse responses of the two receiving filters shown in FIG. 47, in which case the value g=0.003 was selected for the weighting factor for affecting the noise transmission functions. The absolute error is in this case less than 2% in the individual branches.

Figure 50:
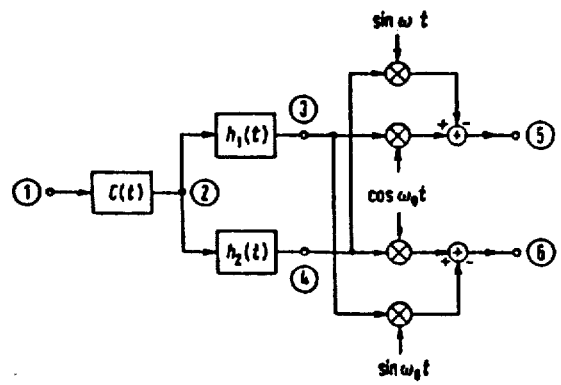

FIGS. 48 and 49 (FIGS. 9a and 9b of original article) show the step-shaped input elementary signals as well as the individual partial reactions. The associated measuring points can be seen in FIG. 50 (FIG. 10 of the original article). It will be recognized that still higher frequency signal components are contained in the partial reactions after the demodulation. This is related to the inexact maintenance of the conditions (6) and (15).

In the second application example a modem with a transmission speed of 4800 bit/s is considered. A step rate of 1.6 kBaud was recommended for this purpose by the CCITT and a carrier frequency of 1.8 kHz as well as an 8-phase transmission [7].

For the design of a transmitting filter pair a filter length of 48 coefficients per branch was postulated for the case of a sampling frequency of 9.6 kHz. With a Fourier approximation of the desired frequency characteristic for the transmitting filter $G_{1,2}^w(\omega)/D(\omega)$ there is obtained, for the selection of a roll-off factor $\alpha = 0.5$ a deviation of the transmitting spectrum of less than $0.6 \cdot 10^{-2}$ in the overall approximation interval running from 0 to 4.8 kHz. As in the first example a Butterworth lowpass filter of the sixth degree with 3 dB limit frequency of 3.2 kHz was selected for the analog smoothing filter.

In the receiver, in the case of the selected high transmission rate in this example the use of an adaptive distortion eliminator is in general necessary. Consequently, an automatically adjusting filter pair should be selected, as described in section 4.2.2.

The behavior of the adaptive filter pair will be shown by means of a digital computer simulation. In this case the value sequence at the output of the transmission channel in the case of 8-phase transmission and stochastic excitation was simulated for a sampling frequency of 6.4 kHz. The artificial line described in the first example with the pulse response shown in FIG. 46 (FIG. 7 of original article) can serve as the channel.

A filter length M=16 was selected for the iterative calculation of the filter coefficients. No averaging was carried out in the initial adjustment algorithms according to equation (30) with a view to an implementation which would be as simple as possible.

Figure 51:
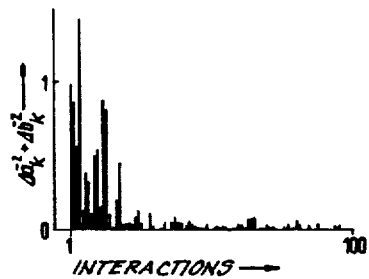
Figure 52:
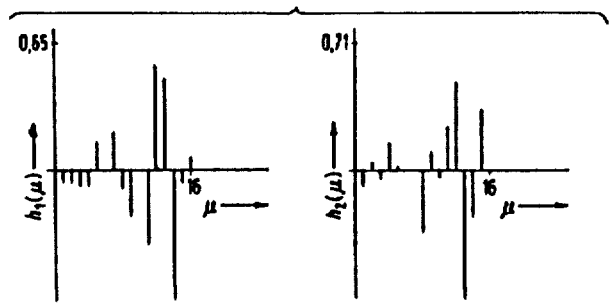

FIG. 51 (FIG. 11 of the original article) shows the squared error at the output of the filter pair during the start-up or run-in phase for $\gamma = 1.8$ and g=0.01. The filter coefficients resulting after 200 iterations are illustrated in FIG. 52. With these coefficients an averaged squared error of 0.006 per simulation was obtained.

[acknowledgment omitted]

REFERENCES

Kammeyer & Schenk (Exp. Syst.) Parts I & II)

[1] Schüssler, H. W.; Transmission Systems Optimization by Computer Simulation. NTG-Fachtagung "Informations- und Systemtheorie in der digitalen Nachrichtentechnik". Berlin, Sept. 1978.

[2] Croisier, A.; Pierret, J. M.; The digital echo modulation. Transact. Inst. Electr. Electron, Engrs. COM-18 (1970) S. 367–376.

[3] Choquet, M. F.; Nusshaumer, H. J.; Microcoded modem-transmitters, IBM J. Res. Develop. 18 (1974) S. 338–351.

[4] Giloi, W. K.; Kammeyer, K. D.; On the design of all-digital components for low-speed and high-speed modems using MOS technology, IEEE Internat. Conference on Comm., Minneapolis, Minn. (1974) 6, S. 39C-1 bis 39C-5.

[5] Schenk, H.; Entwurf optimaler Sendesignale für digitale Datensender bei beliebigen linearen Modulationsfornien. Arch. elektr. Übertr. 31, (1977) 7/8. S. 261-266.

[6] CCITT; Draft Recommendation V.29-9600 bits per second modem for use on leased circuits. (1976).

[7] van Gerwen, P. J.; Verhoeckx, N. A. M.; van Essen. H. A.; Snijders, F. A. M.; Microprocessor implementation of high speed data modems, IEEE Trans. on Comm. COM-25 (1977) 2, S. 238-249.

[8] Akashi, F.; Tatsui, N.; Sato. Y.; Koika, S.; Marumo, Y.; A high performance digital QAM 9600 bit/s modem. NEC Research & Development Nr. 45, (1977) 4, S. 38-48.

[9] Wekerle, W.; Aufbau eines flexiblen digitalen Datensenders mit programmierbarer Modulationsform. Diplomarbeit am Institut f.Nachrichtentechnik. Erlangen (1977).

[10] Förster, H.; Entwurf und Aufbau eines Zusatgerätes zum vorhandenen Datenübertragungssystem. Diplomarbeit am Institut für Nachrichtentechnik, Erlangen (1978).

[11] Volder, J. E.; The CORDIC Trigonometric Computing Technique. IRE Trans. Comput., EC-8 (1959) S. 330-334.

[12] Büttner, M.; Eckhardt, B.; Oetken, G.; Messtechnick in der seriellen digitalen Signalverarbeitung. Ausgewähite Arbeiten über Nachrichtensysteme. Herausgegeben von H. W. Schüssler, Erlangen (1976).

[13] Croisier, A.; Esterban, D. J.; Levilion, M. F.; Riso. V.; Digital Filter for PCM Encoded Signals, U.S. Pat. No. 3777 130, (1973) 12.

[14] Peled, A.; Liu, B.; A new hardware realization of digital filters, IEEE Trans. on ASSP, ASSP-22 (1974) 12, S, 456-462.

[15] Büttner, M.; Schüssler, H. W.; On structures for the implementation of the distributed arithmetic. Nachr. techn. Z. 29 (1976) 6, S. 472-477.

[16] Kammeyer, K.D.; Digital filter realization in distributed arithmetic. Europ. Conf. on Circuit Theory and Design. Genua, (1976) 9. S. 717-725.

[17] Belsemeyer. G.; Entwurf and Aufbau eines komplexen Demodulators, Dipolomarbeit am Instit f. Nachrichtentechnik, Erlangen, (1977).

[18] Bedrosian, S. D.; Normalized Design of 90° Phase-Difference Networks II Trans. on Circuitry Theory, 7 (1960) S. 128-136.

[19] Schüssler, H. W.; Digitale Systeme zur Signalverarbeitung. Springer-Verlag, Berlin (1973).

[20] Ungerboeck, G.; Fractional tap-spacing equalizer and consequences for clock recovery in data modems. IEEE Trans. on Comm., COM-24, (1976) S. 856-864.

[21] Schenk, H.; Eine allgemeine Theorie der Entzerrung von Datenhanälen mit nichtrekursiven Systemen. Arch. elektr. Übertr. 30 (1976) 10. S. 377-380.

[22] Schenk, H.; Ein Beitrag zur digitalen Entzerrung und Impulsformung bei der Datenübertragung über lineare Kanäle, Ausgewählte Arbeiten über Nachrichtensysteme. Herausgegeben von H. W. Schüssler, Erlangen (1978).

[23] Lucky, R.; Rudin, H,; An automatic equalizer for general purpose communication channels, Bell Syst. Tech. J. 46 (1967) S. 2179-2208.

[24] Gersho. A.; Adaptive equalization of highly dispersive channels for data transmission. Bell Syst. Tech. J. 48 (1969) S, 55-70.

[25] Beck. W.; Entwurf und Aufbau eines digitalen adaptiven Entzerrers. Diplomarbeit am Institut f. Nachrichtentechnik, Erlangen (1978).

[26] Wandel & Goltermann; Beschreibung und Bedienungsanleitung für Leitungsnachbildung TIN-1. Schollmeier & Schatz 1. Gitlin, R. D.: Timing Recovery in PAM Systems. Bell Syst. Techn. J. 50 (1971), S. 1645-1669

2. Stiffler, J. J.: Theory of Synchronous Communications. New York: Prentice Hall 1971

3. Lindsey, W. C.; Simon, M. K.: Telecommunication Systems Engineering, New York: Prentice Hall 1973

4. Schollmeier, G.; Schatz, N.: The Design of Nonlinear Phase-Tracking Loops by Simulation. IEEE Trans. COM 23 (1975), S. 296-299

5. Gitlin, R. D.; Ho, E. Y.; Mazo, I. E.: Passband Equalization of Differentially Phase Modulated Data Signals. Bell Syst. Techn. J. 52 (1973), S.219-238

6. Lucky, R. W.; Salz, J.; Weldon, E. J.: Principles of Data Communication. New York: McGraw-Hill 1968

7. Lyon, D. L.: Timing Recovery in Synchronous Equalized Data Communication. IEEE Trans. COM 23 (1975), S.269-274

8. Müller, M.; Müller, K. H.: Adaptive Timing Recovery in Digital Synchronous Data Receivers. Tagungsband Zürich Seminar 1974, S. G6, 1-6

9. Lyon, D. L.: Envelope-Derived Timing Recovery in QAM and SQAM Systems. IEEE Trans. COM 23 (1975), S. 1327-1331

Kammeyer & Schenk (Carrier Reg.)

[1] Kammeyer, K. D. und Schenk, H., Ein analytisches Modell für die Taktableitung in digitalen Modems In Vorbereitung.

[2] Kammeyer, K. D. und Schenk, H., Ein flexibles Experimentiersystem für die Datenübertragung im Fernsprechbereich, Frequenz 33 [1979], 41-143, 165-172.

[3] Schollmeier, G. und Schatz, N., Verfnbren zur Trü ger- und Taktregelung bei synchroner Datenübertragung. Siemons Forschungs. und Entwicklungsher, 6 [1977]. 271-276.

[4] Schüssler, H. W., Digitale Systems zur Signalverarbeitung, Springer-Verlag, Berlin 1973.

[5] Falconer, D. D., Jointly adaptive equalization and carrier recovery in two-dimensional digital communication systems, Bell Syst. tech. J. 55 [1976], 317-334.

[6] CCITT, Draft Recommendation V.29-9600 bits per second modem for use in leased circuits. Genf 1976.

[7] Bolsinger, P., Realisierung einer digitalen Träger- und Taktrückgewinnungsschaltung für ein vorhandenes Datenübertragungssystem. Diplomarbeit am Lehratuhl für Nachrichtentechnik, Universität Erlangen, 1978.

[8] Wandel & Goltermann, Beachreibung und Bedienungsanleitung für Leitunganachbildung TLN.1.

[9] Schenk, H., Eine allgemeine Theorie der Entzerrung von Datenkanälen mit nichtrekursiven Systemen. AEÜ 80 [1976], 377-380.

Schenk

[1] Kammeyer, K. D. and Schenk, H., Ein flexibles Experimentiersystem für die Datenübertragung im Fernsprechbereich. Frequenz 33 [1979], 141-145, 165-172.

[2] Schenk, H., Entwurf optimaler Sendesignale für digitale Datensender bei beliebigen linearen Modulations-formen. AEÜ 31 [1977], 261-266.

[3] Schüssler. H. W., Digitale Systeme zur Signalverarbeitung. Springer-Verlag, Berlin 1973.
[4] Schenk, H., Ein Beitrag zur digitalen Entzerrung und Impulsformung bei der Datenübertragung über lineare Kanäle. Ausgewählte Arbeiten über Nachrichtensysteme, Nr.30, herausgegeben von H. W. Schüssler, Erlangen 1978.
[5] CCITT, Recommendation V.26: 2400 bits per second modem standardized for use on four-wire leased circuits. Green Book, Vol. VIII, ITU, Genf 1973.
[6] Wandel und Goltermann, Beschreibung und Bedienungsanleitung für Leitungsnachbildung TLN-1.
[7] CCITT, Recommendation V.27: 4800 bits per second modem standardized for use on leased circuits. Green Book, Vol. VIII, ITU, Genf 1973.

FIG. 48.
FIG. 49.
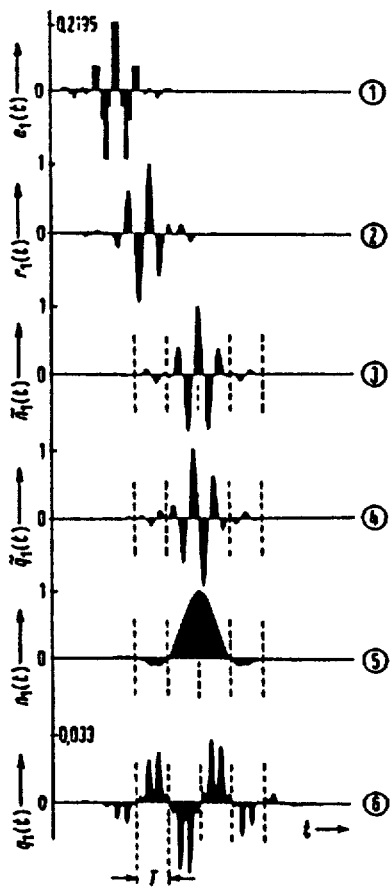
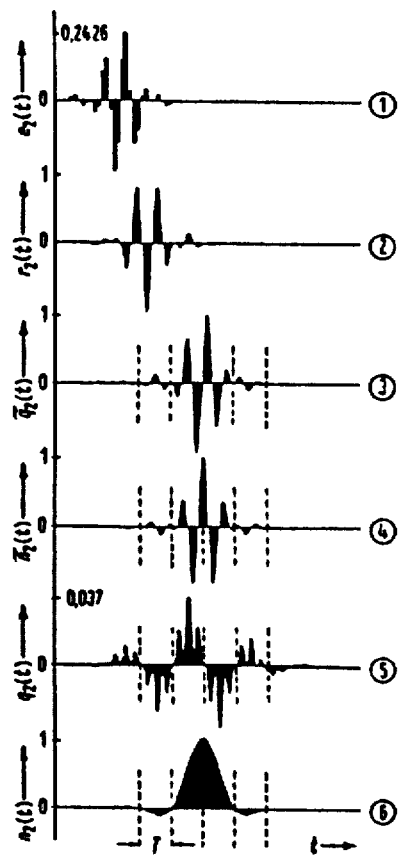

We claim:

1. Apparatus for receiving data transmitted or recorded synchronously in the form of a multisptep-coded modulated wave signal modulated at least in part in multistep phase or frequency modulation, which data are subject to timing jitter and to sudden and short-interval, changes of amplitude after transmision or recording and before reception, said apparatus comprising an analog-to-digital converter, a quadrature pair of digital bandpass filters connected so that both said filters are supplied with output signals from said analog-to-digital converter, a decision circuit for selecting a complex data signal from a set of predetermined complex reference data signals which most nearly approximates a complex data signal constituted by contemporary outputs of said filters during intervals of predetermined length, said decision circuit being connected to the outputs of said filters by switching means defining said intervals and further comprising"
  means for clocking said analog-to-digital converter at a controllable rate in a frequency range in the neighborhood of a predetermined rate, determined from input signal characteristics expected from transmission or recording standards, in response to a timing control signal;
  means for deriving said timing control signal by comparison of input and output signals of said decision circuit and for applying said frequency control signal to said clocking means, and
  means provided in said filters for varying the propogation time therethrough of signals supplied by said analog-to-digital converter, and for accomplishing said variation in response to said timing control signal, said filters being constituted for providing stepwise variable propagation time therethrough without substantial change of filter bandwidth and being connected to said timing control signal deriving mans for propagation time control in response to said control signal.

2. Apparatus according to claim 1, wherein said timing control signal deriving means is constituted to operate by multiplicative comparison of said input and output signals of said decision circuit.

3. Apparatus according to claim 2, in which said filters of said quadrature pair of digital bandpass filters are nonrecursive filters and in which said means for varying the propagation time therethrough comprises an electronic permanent memory constituted so as to store a set of filter coefficients selectable for controlling the propagation time of said filters in response to said timing control signal.

4. Apparatus according to claim 3, in which said electronic permanent memory is constituted so as to store a set of filter coefficient corrections, selectable for correcting a nominal filter coefficient of each of said quadrature pair of bandpass filters and thereby controlling the propagation time of said filters in response to said frequency control signal.

5. Apparatus according to claim 1, in which said decision circuit is equipped with means for providing a variable amplitude threshhold for distinguishing between amplitude levels of the square of the modulus of said complex data signals, in response to variations of averaged input signal strength.

6. Apparatus according to claim 5, in which said variation of said amplitude threshhold is controlled by comparison of an averaged square of the modulus of complex data signals furnished by said filters to said decision circuit with the square of the modulus of said complex data reference signals.

7. Apparatus according to claim 6, in which means are provided for multiplying the result of said comparison of said averaged square modulus with said reference squared modulus by a weighting factor less than unity in order to produce a control signal for said amplitude threshhold.

* * * * *

UNITED STATES PATENT AND TRADEMARK OFFICE
CERTIFICATE OF CORRECTION

PATENT NO. :   4,646,173

DATED      :   February 24, 1987

INVENTOR(S) :  Karl-Dirk KAMMEYER et al

It is certified that error appears in the above-identified patent and that said Letters Patent is hereby corrected as shown below:

Add the attached Figs. 9 - 52.

Column 3, line 28, "Figs. 9-51" should read --Figs. 9-52--.

Signed and Sealed this

Fourth Day of October, 1988

Attest:

DONALD J. QUIGG

Attesting Officer

Commissioner of Patents and Trademarks

OUTPUT OF TRANSMITTER $C_i$ OUTPUT 9.6 kBIT/S 14.4 kBIT/S

DEVIATION $\Delta a_k$ AND COEFFICIENTS $\alpha_{l,ZZ}(v)$
DURING START UP PHASE
OF THE DISTORTION ELIMINATOR $\Omega = 2\pi f/f_A,$ $\Omega_{S1} = 2\pi \left[ \dfrac{f_m}{f_A} - \dfrac{1}{2} \dfrac{f_T}{f_A} (1+\alpha) \right],$ $\Omega_{D1} = 2\pi \left[ \dfrac{f_m}{f_A} - \dfrac{1}{2} \dfrac{f_T}{f_A} (1-\alpha) \right],$ $\Omega_m = 2\pi f_m/f_A,$ $\Omega_{D2} = 2\pi \left[ \dfrac{f_m}{f_A} + \dfrac{1}{2} \dfrac{f_T}{f_A} (1-\alpha) \right],$ $\Omega_{S2} = 2\pi \left[ \dfrac{f_m}{f_A} + \dfrac{1}{2} \dfrac{f_T}{f_A} (1+\alpha) \right].$